United States Patent
Chou et al.

(10) Patent No.: US 12,540,421 B2
(45) Date of Patent: Feb. 3, 2026

(54) CARBON NANOTUBE COLLECTION APPARATUS, CARBON NANOTUBE MANUFACTURING APPARATUS, AND CARBON NANOTUBE COLLECTION METHOD

(71) Applicants: DOWA THERMOTECH CO., LTD., Tokyo (JP); MEIJO NANO CARBON CO., LTD., Aichi (JP); OSAKA SODA CO., LTD., Osaka (JP)

(72) Inventors: Shinya Chou, Aichi (JP); Maya Kamioka, Aichi (JP); Takahiro Fujita, Aichi (JP); Takeshi Hashimoto, Aichi (JP); Kei Takano, Aichi (JP); Hisato Kagawa, Osaka (JP)

(73) Assignees: DOWA THERMOTECH CO., LTD., Tokyo (JP); MEIJONANO CARBON CO., LTD., Aichi (JP); OSAKA SODA CO., LTD., Osaka (JP)

( * ) Notice: Subject to any disclaimer, the term of this patent is extended or adjusted under 35 U.S.C. 154(b) by 229 days.

(21) Appl. No.: 18/274,044

(22) PCT Filed: Sep. 28, 2022

(86) PCT No.: PCT/JP2022/036166
§ 371 (c)(1),
(2) Date: Jul. 25, 2023

(87) PCT Pub. No.: WO2023/058520
PCT Pub. Date: Apr. 13, 2023

(65) Prior Publication Data
US 2024/0246790 A1    Jul. 25, 2024

(30) Foreign Application Priority Data
Oct. 7, 2021 (JP) .................................. 2021-165685

(51) Int. Cl.
*D01F 9/133* (2006.01)
*B65H 54/72* (2006.01)
(Continued)

(52) U.S. Cl.
CPC .............. *D01F 9/133* (2013.01); *B65H 54/72* (2013.01); *B65H 67/0411* (2013.01);
(Continued)

(58) Field of Classification Search
CPC ................................. C01B 32/16; D01F 9/133
See application file for complete search history.

(56) References Cited

U.S. PATENT DOCUMENTS 7,045,108 B2 * 5/2006 Jiang ..................... D01F 9/1275
423/447.2
2008/0018012 A1 * 1/2008 Lemaire .................. D01F 9/133
425/75
(Continued)

FOREIGN PATENT DOCUMENTS

JP          62-53418        3/1987
JP          2004-190166     7/2004
(Continued)

OTHER PUBLICATIONS

Office Action issued in Corresponding Russian Patent Application No. 2023121168/04(046288), dated Oct. 29, 2024, along with an English translation thereof.
(Continued)

*Primary Examiner* — Timothy Kennedy
(74) *Attorney, Agent, or Firm* — Greenblum & Bernstein, P.L.C.

(57) ABSTRACT

A carbon nanotube collection apparatus includes: a collection room having an opening part communicating with a carbon nanotube production apparatus; a winding member arranged inside the collection room and configured to wind (Continued)

a carbon nanotube passed through the opening part from the carbon nanotube production apparatus to form a carbon nanotube wound body; and a separation mechanism configured to move the carbon nanotube wound body from a base end side toward a tip end side of the winding member to separate the carbon nanotube wound body from the winding member.

19 Claims, 16 Drawing Sheets

(51) Int. Cl.
  *B65H 67/04* (2006.01)
  *C01B 32/16* (2017.01)
  *C01B 32/168* (2017.01)
(52) U.S. Cl.
  CPC ............ *C01B 32/16* (2017.08); *C01B 32/168* (2017.08); *B65H 2701/314* (2013.01)

(56) References Cited

U.S. PATENT DOCUMENTS

| | | | | |
|---|---|---|---|---|
| 2008/0170982 A1* | 7/2008 | Zhang | ............... | C04B 35/62897 |
| | | | | 423/447.3 |
| 2009/0087543 A1* | 4/2009 | Nicholas | ............... | C30B 29/602 |
| | | | | 205/183 |
| 2009/0311166 A1* | 12/2009 | Hart | ......................... | C01B 32/16 |
| | | | | 977/773 |
| 2013/0309473 A1* | 11/2013 | Sundaram | ............... | D01F 9/127 |
| | | | | 428/338 |
| 2015/0240391 A1* | 8/2015 | Oh | ......................... | D01F 9/133 |
| | | | | 423/447.2 |
| 2017/0306529 A1 | 10/2017 | Oh et al. | | |
| 2019/0177166 A1* | 6/2019 | Oh | ......................... | C01B 32/168 |
| 2020/0148539 A1* | 5/2020 | Boulanger | ............... | D01F 9/127 |

FOREIGN PATENT DOCUMENTS

| | | | | |
|---|---|---|---|---|
| JP | 2011202338 A | * | 10/2011 | ............. B82Y 30/00 |
| JP | 2012-46841 | | 3/2012 | |
| JP | 2018-505969 | | 3/2018 | |
| JP | 2019-64918 | | 4/2019 | |
| TW | 201708103 | | 3/2017 | |

OTHER PUBLICATIONS

International Search Report Issued in International Patent Application No. PCT/JP2022/036166, dated Nov. 22, 2022, along with an English translation thereof.

Written Opinion of the International Searching Authority for International Patent Application No. PCT/JP2022/036166, dated Nov. 22, 2022, along with an English translation thereof.

* cited by examiner (A)

(B)

(C)

CARBON NANOTUBE COLLECTION APPARATUS, CARBON NANOTUBE MANUFACTURING APPARATUS, AND CARBON NANOTUBE COLLECTION METHOD

TECHNICAL FIELD

The present invention relates to a carbon nanotube collection apparatus for collecting a carbon nanotube, a carbon nanotube manufacturing apparatus having the carbon nanotube collection apparatus, and a carbon nanotube collection method.

BACKGROUND ART

The carbon nanotube has excellent characteristics such as electrical conductivity, thermal conductivity, mechanical strength, and so on, and is thus a new material attracting attention in many fields. As a carbon nanotube manufacturing apparatus, there is a known manufacturing apparatus using the chemical vapor deposition method (namely, the CVD method) of producing the carbon nanotube by thermally decomposing a raw material containing carbon (carbon source) disclosed in Patent Document 1.

Besides, Patent Document 2 discloses the provision of a collection apparatus in or near a collection part of a reaction furnace for producing the carbon nanotube by the CVD method. The collection apparatus disclosed in Patent Document 2 is an apparatus which rolls a winding member for winding the carbon nanotube to wind the carbon nanotube into a roll shape and form a wound body, and takes the wound body out from a takeout port provided at the collection part to collect the carbon nanotube.

PRIOR ART DOCUMENT

Patent Document

Patent Document 1: Japanese Laid-open Patent Publication No. 2019-064918
Patent Document 2: Japanese Laid-open Patent Publication No. 2004-190166

SUMMARY OF THE INVENTION

Problems to be Solved by the Invention

In the carbon nanotube collection apparatus disclosed in Patent Document 2, the wound body is taken out of the collection part at the stage that the wound body of the carbon nanotube reaches a predetermined diameter.

Therefore, every time one wound body of the carbon nanotube is manufactured, it is necessary to perform the stop of the carbon nanotube production apparatus, lowering of the temperature of the reaction furnace, and replacement of the atmosphere in the reaction furnace, and after the collection of the carbon nanotube, it is also necessary to restart the carbon nanotube production apparatus after the replacement of the atmosphere in the reaction furnace and heating of the reaction furnace are performed. In other words, the carbon nanotube collection apparatus disclosed in Patent Document 2 has a long time during which no carbon nanotube is produced and which occurs every time one wound body is collected. Therefore, a problem in the case of massively manufacturing the carbon nanotube is that the manufacturing time for manufacturing a desired amount of carbon nanotubes is long.

The present invention has been made in consideration of the above circumstances, and has an object to provide a carbon nanotube collection apparatus, a carbon nanotube manufacturing apparatus, and a carbon nanotube manufacturing method capable of shortening a manufacturing time to manufacture a desired amount of carbon nanotubes in massively manufacturing carbon nanotubes.

Means for Solving the Problems

In order to solve the above problem, the present inventors have acquired the finding that it is possible to continuously perform the formation and the separation of a carbon nanotube wound body by providing a separation mechanism which separates the carbon nanotube wound body from a winding member. In addition, the present inventors have found that the provision of the separation mechanism enables collection of a plurality of carbon nanotube wound bodies in bulk to reduce the collection frequency of the carbon nanotube wound bodies, and come to complete the present invention.

An aspect of the present invention for solving the above problem is disclosed below.

[1] A carbon nanotube collection apparatus for collecting a carbon nanotube produced by a carbon nanotube production apparatus, the carbon nanotube collection apparatus including:
  a collection room having an opening part communicating with the carbon nanotube production apparatus;
  a winding member arranged inside the collection room and configured to wind the carbon nanotube passed through the opening part from the carbon nanotube production apparatus to form a carbon nanotube wound body; and
  a separation mechanism configured to move the carbon nanotube wound body from a base end side toward a tip end side of the winding member to separate the carbon nanotube wound body from the winding member.

[2] The carbon nanotube collection apparatus according to [1], further including
  a separation member arranged on the base end side of the winding member and configured to come into contact with the carbon nanotube wound body, wherein
  the separation mechanism is a mechanism configured to move one or both of the winding member and the separation member so that a tip of the winding member and the separation member relatively come closer.

[3] The carbon nanotube collection apparatus according to [2], wherein
  the separation mechanism is a mechanism configured to move the winding member in a direction of pulling the winding member out of the collection room.

[4] The carbon nanotube collection apparatus according to [2], wherein:
  the separation member is a push-out member arranged in the collection room; and
  the separation mechanism is a mechanism configured to move the push-out member from the base end side toward the tip end side of the winding member to push out and separate the carbon nanotube wound body from the tip of the winding member.

[5] The carbon nanotube collection apparatus according to [4], wherein the push-out member is formed in a manner to surround an outer periphery of the winding member.

[6] The carbon nanotube collection apparatus according to any one of [1] to [5], further including
a guide member configured to guide the carbon nanotube passed through the opening part to the winding member.

[7] The carbon nanotube collection apparatus according to any one of [1] to [6], further including:
a rotary body to which a base end of the winding member is attached; and
a compression member configured to come into contact with the carbon nanotube wound body wound on the winding member, wherein
the compression member extends in a rotation axis direction of the rotary body and is arranged at a lateral side of the winding member as viewed from the rotation axis direction of the rotary body.

[8] The carbon nanotube collection apparatus according to [7], wherein
the compression member is configured to rotate in a direction opposite to a rotation direction of the winding member.

[9] The carbon nanotube collection apparatus according to any one of [1] to [8], further including
a rotary body to which a base end of the winding member is attached, wherein
the winding member is supported in a cantilever state by the rotary body.

[10] The carbon nanotube collection apparatus according to any one of [1] to [9], further including:
a plurality of the winding members;
a first rotary body to which a base end of a first winding member is attached; and
a second rotary body to which a base end of a second winding member is attached, wherein
each of rotation axes of the first rotary body and the second rotary body is in a direction perpendicular to a center line of the opening part and in a horizontal direction.

[11] The carbon nanotube collection apparatus according to [10], wherein
a position of the rotation axis of the first rotary body and a position of the rotation axis of the second rotary body in a direction perpendicular to the center line of the opening part when viewed from the rotation axis direction of the first rotary body are different from each other.

[12] The carbon nanotube collection apparatus according to [11], wherein
the center line of the opening part is located between the rotation axis of the first rotary body and the rotation axis of the second rotary body.

[13] The carbon nanotube collection apparatus according to [12], wherein
when a region extending from the opening part toward an inner side of the collection room along the center line of the opening part is defined as an exit side region of the opening part,
a width of the exit side region when viewed from the rotation axis direction of the first rotary body and a width of the opening part have a same length, and
none of the plurality of winding members are arranged in the exit side region.

[14] The carbon nanotube collection apparatus according to any one of to [13], further including:
a third rotary body to which a base end of a third winding member is attached; and
a fourth rotary body to which a base end of a fourth winding member is attached, wherein:
each of rotation axes of the third rotary body and the fourth rotary body is in a direction perpendicular to the center line of the opening part and in the horizontal direction;
the first winding member is arranged between a wall surface, of the collection room, provided with the opening part and the third winding member; and
the second winding member is arranged between the wall surface and the fourth winding member.

[15] The carbon nanotube collection apparatus according to [14], wherein:
the center line of the opening part is located between the rotation axis of the first rotary body and the rotation axis of the second rotary body;
the center line of the opening part is located between the rotation axis of the third rotary body and the rotation axis of the fourth rotary body; and
an interval between the third winding member and the fourth winding member is wider than an interval between the first winding member and the second winding member.

[16] A carbon nanotube manufacturing apparatus, including:
a production apparatus for producing a carbon nanotube; and
the carbon nanotube collection apparatus according to any one of [1] to [15].

[17] A carbon nanotube collection method using the carbon nanotube collection apparatus according to [1] or [2], the carbon nanotube collection method including:
a formation step of forming a carbon nanotube wound body by winding a carbon nanotube passed through the opening part of the carbon nanotube collection apparatus by the winding member; and
a separation step of separating the carbon nanotube wound body from the winding member by moving the carbon nanotube wound body from the base end side toward the tip end side of the winding member, wherein
the formation step and the separation step are repeatedly performed to form a plurality of the carbon nanotube wound bodies and then collect the carbon nanotube wound bodies from the carbon nanotube collection apparatus.

[18] The carbon nanotube collection method according to [17], wherein
in the separation step, the carbon nanotube wound body is separated from the winding member by moving the winding member in a direction of pulling the winding member out of the collection room.

[19] The carbon nanotube collection method according to [17], wherein
in the separation step, the carbon nanotube wound body is separated from the winding member by pushing out the carbon nanotube wound body from the base end side toward the tip end side of the winding member.

Effect of the Invention

According to the present invention, it is possible to provide a carbon nanotube collection apparatus, a carbon nanotube manufacturing apparatus, and a carbon nanotube manufacturing method capable of shortening a manufacturing time to manufacture a desired amount of carbon nanotubes in massively manufacturing carbon nanotubes.

EMBODIMENTS FOR CARRYING OUT INVENTION

Hereinafter, embodiments of the present invention will be explained with reference to the drawings. Note that in this description and the drawings, the same codes are given to elements having substantially the same functional configurations to omit duplicate explanations.

First Embodiment

Figure 1:
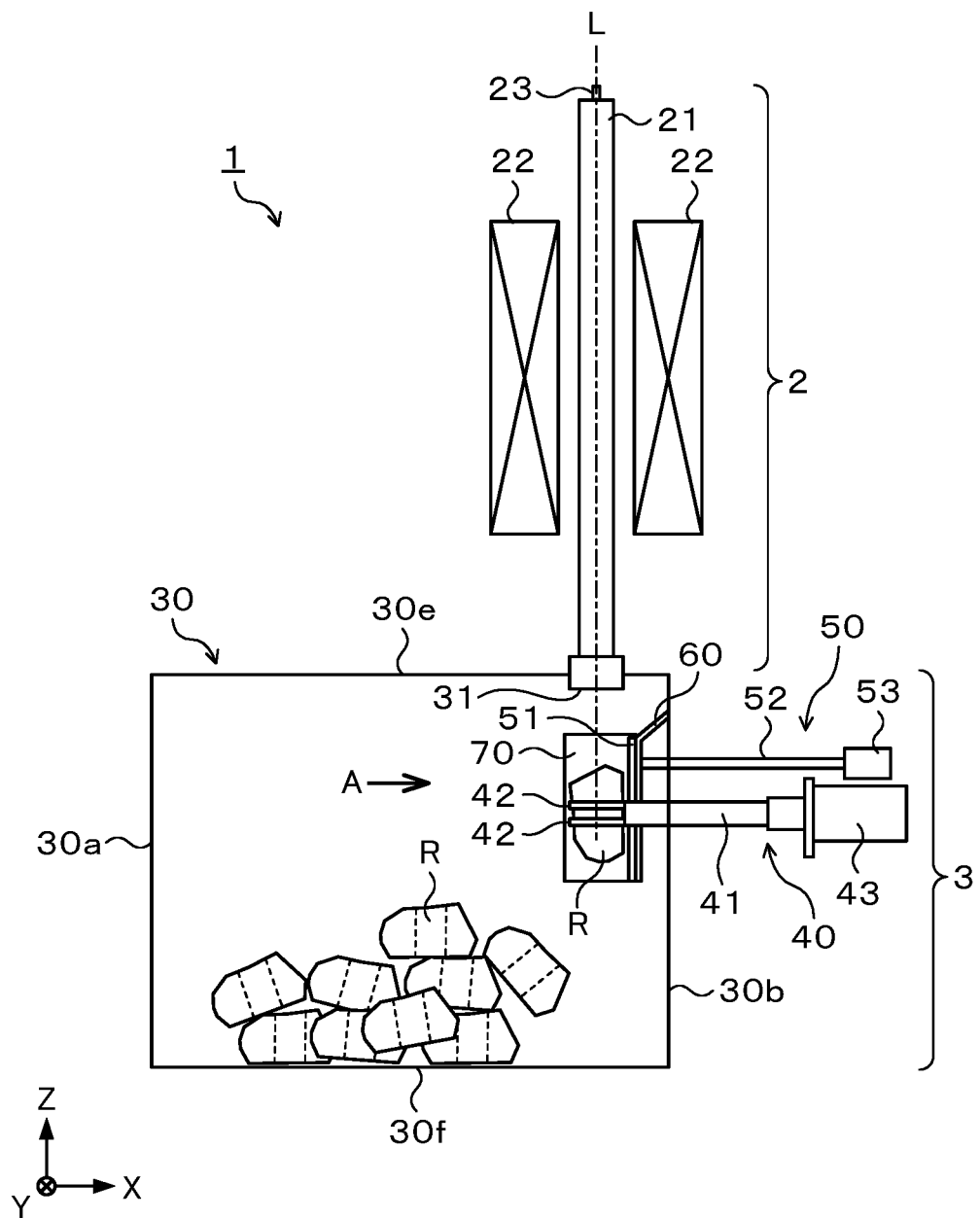
FIG. 1 is an explanatory view illustrating a schematic configuration of a carbon nanotube manufacturing apparatus according to a first embodiment of the present invention.
Figure 2:
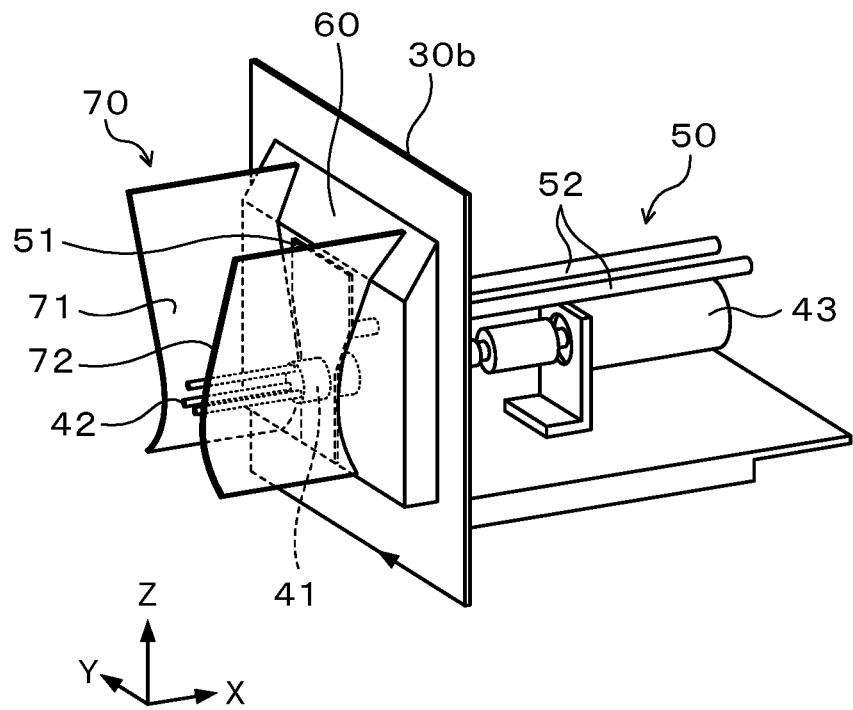
FIG. 2 is a perspective view illustrating a schematic configuration around a winding member.
Figure 3:
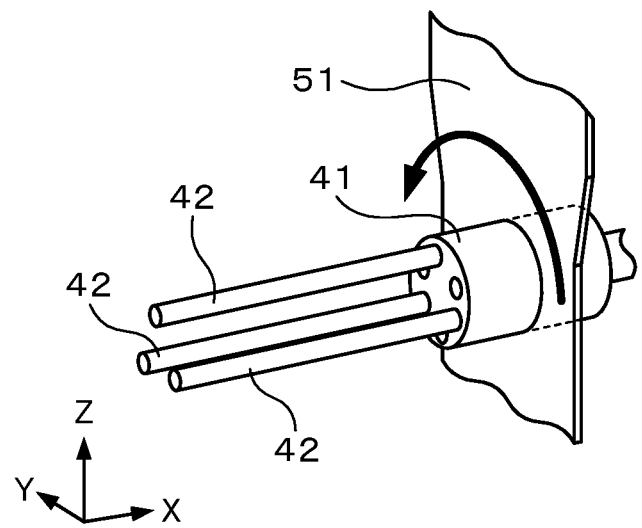
FIG. 3 is an enlarged view of the winding member in FIG. 2.
Figure 4:
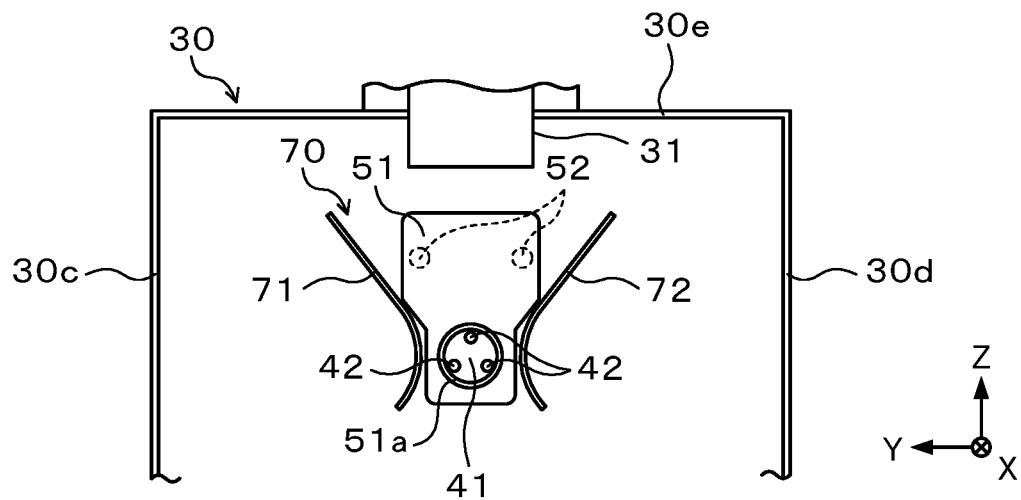
FIG. 4 is a view viewed from a direction of an arrow A in FIG. 1.
Figure 5:
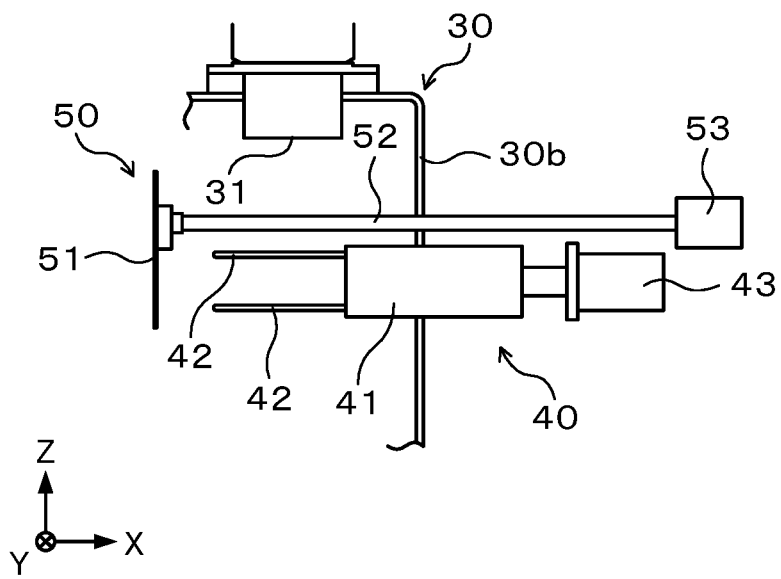
FIG. 5 is a view illustrating a state where a push-out member has moved to a push-out position.

FIG. 1 is an explanatory view illustrating a schematic configuration of a CNT manufacturing apparatus 1 which manufactures a carbon nanotube (hereinafter, may be referred to as "CNT") according to a first embodiment. FIG. 2 is a perspective view illustrating a schematic configuration around a winding member 42. FIG. 3 is an enlarged view of the winding member 42 in FIG. 2. FIG. 4 is a view viewed from a direction of an arrow A in FIG. 1. Note that a later-explained cover member 60 is not illustrated in FIG. 4.

As illustrated in FIG. 1, the CNT manufacturing apparatus 1 has a CNT production apparatus 2 which produces CNTs, and a CNT collection apparatus 3 which is provided at a lower end portion of the CNT production apparatus 2 and collects the CNTs. In the following explanation, the CNT production apparatus 2 may be referred to as "production apparatus 2" and the CNT collection apparatus 3 may be referred to as "collection apparatus 3".

An "X-direction" in the drawings is a depth direction of the collection apparatus 3, a Y-direction" is a width direction of the collection apparatus 3, and a "Z-direction" is a height direction of the collection apparatus 3. The directions X to Z are perpendicular to one another. Note that the structure of the CNT manufacturing apparatus 1 is not limited to the structure illustrated in the drawings, and therefore the Z-direction is not the height direction in some cases depending on the structure of the CNT manufacturing apparatus 1. Further, the CNT in this description is a tubular carbon allotrope (typically, a cylindrical structure with a graphite structure), and includes a so-called single-walled CNT, multi-walled CNT, or carbon nanohorn having a horn-shaped tube tip.

<Carbon Nanotube Production Apparatus>

An apparatus configuration of the production apparatus 2 is not particularly limited as long as it can produce a CNT. For example, the apparatus using the chemical vapor deposition method (namely, the CVD method) of thermally decomposing a source gas containing carbon to produce CNTs as in Patent Document 1 or Patent Document 2 is applicable as the production apparatus 2.

The production apparatus 2 illustrated in FIG. 1 has a reaction tube 21, a heater 22 which is provided on the lateral side of the reaction tube 21, and a raw material supply port 23 for supplying gas being a carbon source and a raw material such as a catalytic metal or a catalytic metal compound to the reaction tube 21.

The shape of the reaction tube 21 is not limited, but is preferably, for example, a straight pipe shape (namely, a shape with a linearly extending axis). Further, the cross-sectional shape of the reaction tube 21 may be a rounded shape such as a circular shape, an elliptical shape, an egg shape, or an oval shape, or a polygonal shape. The shape and the heating method of the heater 22 are not particularly limited as long as they can heat the reaction tube 21 to a temperature suitable for the production of the CNT. For example, the heater 22 only needs to be able to heat the reaction tube 21 preferably to 500° ° C. to 2000° C., and more preferably to 1000° ° C. to 1600° ° C. For example, a tungsten heater capable of heating the reaction tube 21 to 500° ° C. to 2000° C. or a silicon carbide heater (SiC heater) capable of heating the reaction tube 21 to 600° ° C. to 1600° C. is used as the heater 22.

<Carbon Nanotube Collection Apparatus>

The collection apparatus 3 has a collection room 30 for collecting the CNT, a winding mechanism 40 which winds the CNT, and a separation mechanism 50 which separates a CNT wound body R.

Although the shape of the collection room 30 is not particularly limited, the collection room 30 in this embodiment is formed in a rectangular parallelepiped shape. The collection room 30 has a side surface part 30a and a side surface part 30b which are wall surfaces perpendicular to the X-direction, a side surface part 30c and a side surface part 30d which are wall surfaces perpendicular to the Y-direction (FIG. 4), and a ceiling surface part 30e and a bottom surface part 30f which are wall surfaces perpendicular to the Z-direction.

The ceiling surface part 30e of the collection room 30 is provided with an opening part 31 communicating with the lower end of the reaction tube 21 of the production apparatus 2. The CNTs produced in the reaction tube 21 are transported together with the source gas into the collection room 30 through the opening part 31. The collection room 30 has a volume capable of housing a plurality of CNT wound bodies R separated from the later-explained winding member 42.

The winding mechanism 40 for winding the CNTs is provided at the side surface part 30b of the collection room 30. The winding mechanism 40 has a rotary body 41, the winding member 42, and a driving part 43.

The rotary body 41 is provided in a manner to penetrate the side surface part 30b of the collection room 30, and a part of the rotary body 41 projects into the collection room 30. The shape of the rotary body 41 is preferably, for example, a circular columnar shape.

The rotary body 41 is preferably arranged to extend perpendicular to an axis L of the reaction tube 21 of the production apparatus 2. Note that the rotary body 41 extending in the X-direction is illustrated as an example of the direction perpendicular to the axis L in the example illustrated in FIG. 1 but, for example, the Y-direction is also a direction perpendicular to the axis L and the rotary body 41 may extend in the Y-direction. Besides, in the case where the axis L extends in the vertical direction, both the X-direction and the Y-direction are directions perpendicular to the vertical direction (namely, horizontal directions), and therefore the rotary body 41 extending in the X-direction or the Y-direction in this case can be rephrased as extending in the horizontal direction.

Note that the reaction tube 21 is sometimes arranged such that the axis L is oriented in the horizontal direction. For example, in the case where the axis L of the reaction tube 21 is oriented in the X-direction, the directions perpendicular to the axis L are, for example, the Y-direction and the Z-direction.

The winding member 42 is a member which extends in the axial direction of the rotary body 41. A base end of the winding member 42 is attached to a tip of the rotary body 41 (an end portion on the collection room 30 side), and the winding member 42 is supported in a cantilever state by the rotary body 41. Note that the installation position of the winding member 42 is not particularly limited, but the winding member 42 only needs to be provided at a position where it can come into contact with the CNTs passed through the opening part 31 of the collection room 30.

As illustrated in FIG. 3, three winding members 42 are arranged at equal intervals along the circumferential direction of the rotary body 41. The number of the winding members 42 is not limited to this but may be at least one, and provision of a plurality of winding members 42 can increase the contact frequency between the CNTs passed through the opening part 31 and the winding members 42. This facilitates entanglement of the CNTs with the winding members 42 and can make it easy to form the CNT wound body R. In terms of obtaining this effect, the number of the winding members 42 is preferably 2 to 6, and more preferably 3 to 4.

Note that the shape of the winding member 42 is not particularly limited as long as it can form the CNT wound body R, such as a conical shape, a polygonal pyramid shape, a circular columnar shape, and a polygonal columnar shape, but in the case where one winding member 42 is provided at the rotation center of the rotary body 41, the winding member 42 preferably has a circular columnar shape. This can make the inner diameter of the CNT wound body R in a donut-type roll shape constant, and reduce the friction coefficient between the inner peripheral surface of the CNT wound body R and the winding member 42 when separating the CNT wound body R from the winding member 42.

The driving part 43 is provided outside the collection room 30. As the driving part 43, for example, a motor or the like is used. The rotary body 41 to which the winding members 42 are attached is connected to the driving part 43, so that when the rotary body 41 is rotated by the driving part 43, the winding members 42 also rotate integrally with the rotary body 41. The rotation speed of the rotary body 41 is appropriately set according to the production speed of the CNTs and the size of a desired CNT wound body R and is set to, for example, 0.01 to 500 rpm.

According to the winding mechanism 40 configured as above, the CNTs produced in the production apparatus 2 and passed through the opening part 31 come into contact with the winding members 42 which rotate integrally with the rotary body 41. The CNTs in contact with the winding members 42 is then wound in a donut-type roll shape along a virtual circle being an orbit of the winding members 42 at the rotation of the rotary body 41 to form the CNT wound body R.

As illustrated in FIG. 1 and FIG. 2, the separation mechanism 50 which separates the CNT wound body R from the winding members 42 is provided at the side surface part 30b of the collection room 30. The separation mechanism 50 has a push-out member 51 which pushes out the CNT wound body R, a driving rod 52 which is connected to the push-out member 51, and a driving part 53 which applies a driving force for moving the driving rod 52 in the X-direction. A part of the driving rod 52 is arranged in a manner to project from the side surface part 30b of the collection room 30 into the collection room 30.

The push-out member 51 is an example of a separation member that is arranged on the base end side of the winding members 42 and comes into contact with the CNT wound body R. The push-out member 51 in this embodiment is formed in a flat-plate shape and arranged in the collection room 30 in an orientation perpendicular to the X-direction.

The push-out member 51 has an opening part 51a (FIG. 4) through which the rotary body 41 and the winding members 42 can pass. The provision of the opening part 51a prevents the push-out member 51 from interfering with the rotary body 41 and the winding members 42 even if the push-out member 51 moves in the X-direction.

Figure 6:
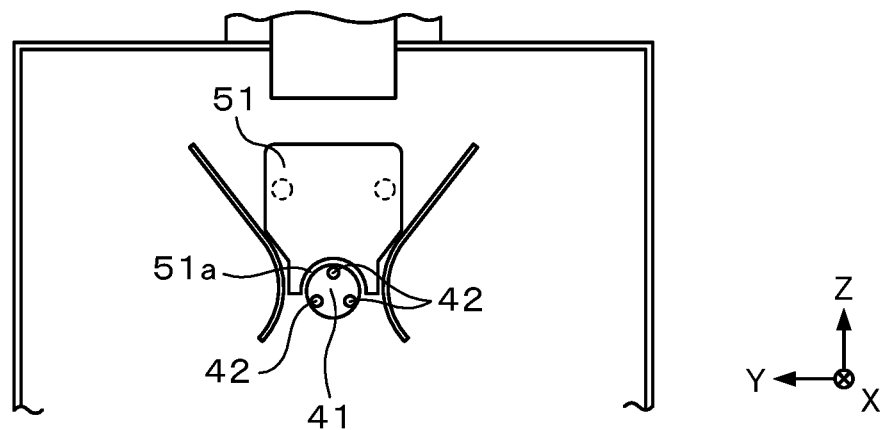
FIG. 6 is a view illustrating a shape example of the push-out member.

The shape of the push-out member 51 is not particularly limited, but only needs to be a shape which can come into contact with the CNT wound body R when the push-out member 51 moves from the base end side toward the tip end side of the winding members 42. For example, the push-out member 51 illustrated in FIG. 4 has a shape surrounding the outer periphery of the rotary body 41 and the winding members 42, but the push-out member 51 may have a shape which covers only part of the outer periphery of the rotary body 41 and the winding members 42 as illustrated in FIG. 6. Note that the opening part 51a of the push-out member 51 in an example in FIG. 6 is a semicircular cutout formed at a lower end portion of the push-out member 51.

The push-out member 51 may have a Teflon (registered trademark) coating on its surface so as to suppress sticking to the CNT wound body R with which the push-out member 51 comes into contact.

The driving part 53 is provided outside the collection room 30. The driving rod 52 with the push-out member 51 attached thereto is connected to the driving part 53, and the driving rod 52 is configured to be movable along the rotation axis direction (X-direction) of the winding members 42 by the driving part 53. This enables the push-out member 51 to move in a manner to come close to or separate from the tips of the winding members 42. Note that the configuration of the driving part 53 is not particularly limited as long as it generates a driving force for moving the push-out member 51 from the base end side toward the tip end side of the winding members 42, but it is preferable to use, for example, a cylinder which makes the push-out member 51 linearly move as the driving part 53. As the cylinder, for example, an air cylinder, a hydraulic cylinder, an electric cylinder, or the like can be used.

The collection room 30, the winding mechanism 40, and the separation mechanism 50 of the collection apparatus 3 are explained in the above, and the cover member 60 may be provided in the collection room 30 as illustrated in FIG. 1 and FIG. 2. The cover member 60 is provided on the inside of the side surface part 30b of the collection room 30, and has a shape covering partial regions of the rotary body 41 and the driving rod 52 in the axial direction (X-direction). The provision of the cover member 60 can suppress adhesion of the CNTs to the rotary body 41 and the driving rod 52, thereby facilitating the maintenance work.

Further, a guide member 70 may be provided in the collection room 30. The guide member 70 is a member for guiding the CNTs passed through the opening part 31 to the winding members 42. The shape and the configuration of the guide member 70 are not particularly limited, and the guide member 70 is composed of a pair of plate-shaped members 71, 72 (FIG. 4) in this embodiment. The plate-shaped members 71, 72 extend in a direction from the opening part 31 side of the collection room 30 toward the winding members 42 side, and are arranged to sandwich the winding members 42 from lateral sides. Therefore, the pair of plate-shaped members 71, 72 open at the upper end and the lower end as viewed from the rotation axis direction (X-direction) of the winding members 42. Further, the gap between the plate-shaped members 71, 72 changes from the upper end to the lower end, and the gap between the plate-shaped members 71, 72 narrows from the opening part 31 side of the collection room 30 toward the winding members 42 side.

The guide member 70 having the above shape controls the flow of gas flowing into the collection room 30 to make it possible to straighten the gas flow so that it flows toward the winding members 42. This can suppress the adhesion of the CNTs to the vicinity of the opening part 31 due to the disturbance of the gas flow and suppress the occurrence of clogging at the lower end portion of the reaction tube 21. Further, the guide member 70 having the above shape makes it possible to guide more CNTs to the winding members 42 and increase the collection rate of the CNTs. In terms of enhancing the operation and effect, it is preferable that the gap between the top ends (ends on the opening part 31 side) of the plate-shaped members 71, 72 is larger than the diameter of the opening part 31.

Figure 7:
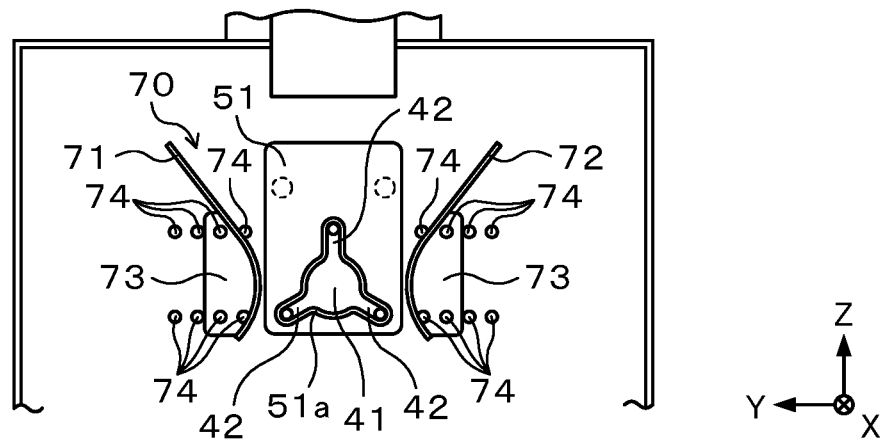
FIG. 7 is a view illustrating an example of a fixed position of a guide member.
Figure 8:
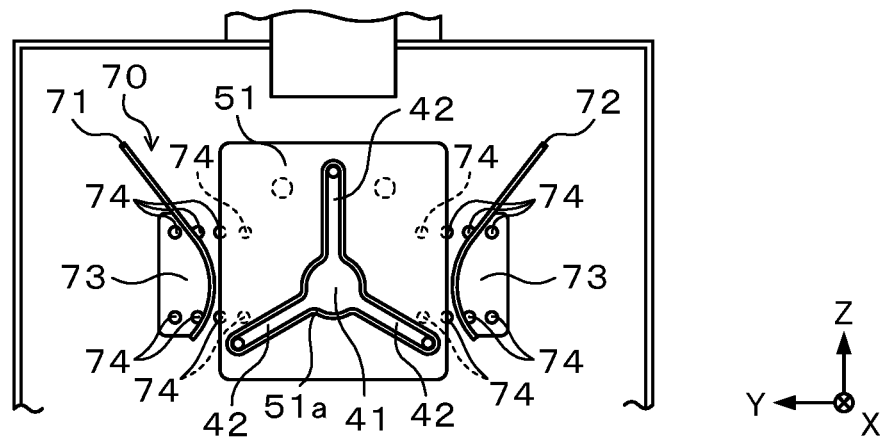
FIG. 8 is a view illustrating an example of the fixed position of the guide member.

Further, in the case where the guide member 70 is composed of the pair of plate-shaped members 71, 72, it is preferable that fixed positions of the plate-shaped members 71, 72 in the Y-direction are adjustable as illustrated in FIG. 7 and FIG. 8. In each of examples illustrated in FIG. 7 and FIG. 8, flat plates 73 are joined to end surfaces of the plate-shaped members 71, 72 on the side surface part 30b side (end surfaces on the deep side of a paper plane), and the flat plates 73 are fixed with, for example, bolts at least at two points of a plurality of predetermined fixed points 74. The guide member 70 having the above configuration can adjust the gap between the plate-shaped members 71, 72 according to the desired size of the CNT wound body R. Note that the shapes of the winding members 42 and the push-out member 51 may be appropriately changed according to the fixed positions of the plate-shaped members 71, 72.

The CNT manufacturing apparatus 1 according to this embodiment is configured as above. Note that materials of members constituting the CNT manufacturing apparatus 1 are not particularly limited as long as they do not inhibit the formation processing of the CNT, and, for example, stainless steel is employed. In the case of this embodiment, stainless steel may be employed as the material of the raw material supply port 23 of the CNT production apparatus 2, and the collection room 30, the opening part 31, the rotary body 41, the winding member 42, the push-out member 51, the driving rod 52, the cover member 60, and the guide member 70 (the plate-shaped members 71, 72 and the flat plate 73) of the CNT collection apparatus 3. Further, members of the members constituting the CNT manufacturing apparatus 1 with which the CNTs may come into contact may have a Teflon coating thereon. In the case of this embodiment, for example, the winding member 42, the push-out member 51, the cover member 60, and the guide member 70 may have a Teflon coating thereon.

Next, the collection method of the CNT using the CNT manufacturing apparatus 1 will be explained.
(Formation Step of CNT Wound Body)

First, the CNTs produced in the reaction tube 21 of the production apparatus 2 move together with a carrier gas from the opening part 31 provided at the collection room 30 of the collection apparatus 3 into the collection room 30. Here, the CNTs introduced into the collection room 30 reach the winding members 42 arranged below the opening part 31. At this moment, the winding members 42 are in a state of rotating around the rotation axis of the rotary body 41, and the CNTs reached the winding members 42 is wound on the winding members 42, whereby a CNT wound body R is formed.

After the CNT wound body R is formed into a predetermined size in the above formation step of the CNT wound body R, a separation step of separating the CNT wound body R from the winding members 42 is performed.

(Separation Step of CNT Wound Body)

When performing the separation step, the separation of the CNT wound body R may be performed in a state of continuing the CNT production, but the production amount of the CNTs may be reduced by reducing the raw material supply amount to the reaction tube 21 or the production of the CNTs may be suspended by stopping the supply itself of the raw material, for example, in a state of maintaining the heating of the reaction tube 21. By reducing the production amount of the CNTs or suspending the production of the CNTs as above, the amount of the CNTs which are not wound on the winding members 42 can be reduced. Further, in the case where a plurality of winding mechanisms 40 are provided, the formation of the CNT wound body R is performed by one winding mechanism, and when separating the CNT wound body R from the winding mechanism, the winding mechanism to be used to wind the CNTs may be switched to another winding mechanism. This makes it possible to wind the CNTs by the other winding mechanism even during the separation work of the CNT wound body R and makes it easy to maintain the production amount of the CNTs.

Figure 9:
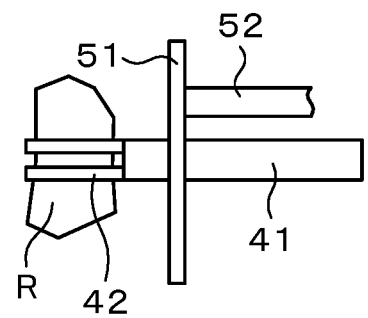
FIG. 9 is a view illustrating a separation operation of a carbon nanotube wound body.
Figure 9:
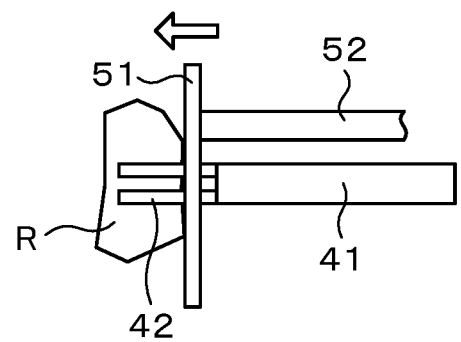
Figure 9:
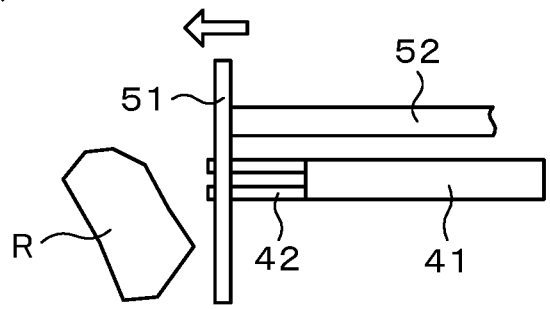
Figure 9:
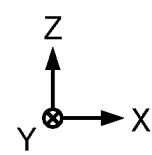

As illustrated in FIG. 9(A), at the starting time point of the separation step, the push-out member 51 is located at a position (initial position) where it is not in contact with the CNT wound body R. Note that the initial position of the push-out member 51 is preferably located on a side closer to the rotary body 41 than the base end of the winding member 42. This makes the CNTs hard to adhere to the push-out member 51 and therefore makes it easier to form the CNT wound body R into a roll shape in the formation step of the CNT wound body R.

The push-out member 51 located at the initial position then moves forward toward the tip end side of the winding members 42 as illustrated in FIG. 9(B). This brings the push-out member 51 into contact with the CNT wound body R.

Then, as illustrated in FIG. 9(C), the push-out member 51 further moves forward to a push-out position in a state where the push-out member 51 and the winding members 42 are in contact with each other. This brings the CNT wound body R into a state where its inner peripheral surface is not supported by the winding members 42, resulting in that the CNT wound body R falls off the winding members 42. Note that the push-out position of the push-out member 51 only needs to be a position where the CNT wound body R can fall off the tips of the winding members 42.

The movement of the push-out member 51 as above separates the CNT wound body R from the winding members 42. Thereafter, the push-out member 51 retracts from the push-out position to the initial position illustrated in FIG. 9(A), with which the separation step ends.

After the end of the separation step, the formation step of the CNT wound body R is performed again. By repeating the formation step and the separation step of the CNT wound body R as above, a plurality of CNT wound bodies R are accumulate at the bottom part of the collection room 30 and are temporarily stored in the collection room 30.

As explained above, in the CNT collection apparatus 3 according to this embodiment, the CNT wound body R formed by the winding members 42 can be separated from the winding members 42 by the separation mechanism 50. Along with this, the separated CNT wound body R can be temporarily stored in the collection room 30, and therefore the formation and separation of a next CNT wound body R can be repeatedly performed even if the CNT wound body R is not collected every time the CNT wound body R is formed. Then, the CNT wound bodies R temporarily stored in the collection room 30 can be collected in bulk at predetermined timing.

Figure 10:
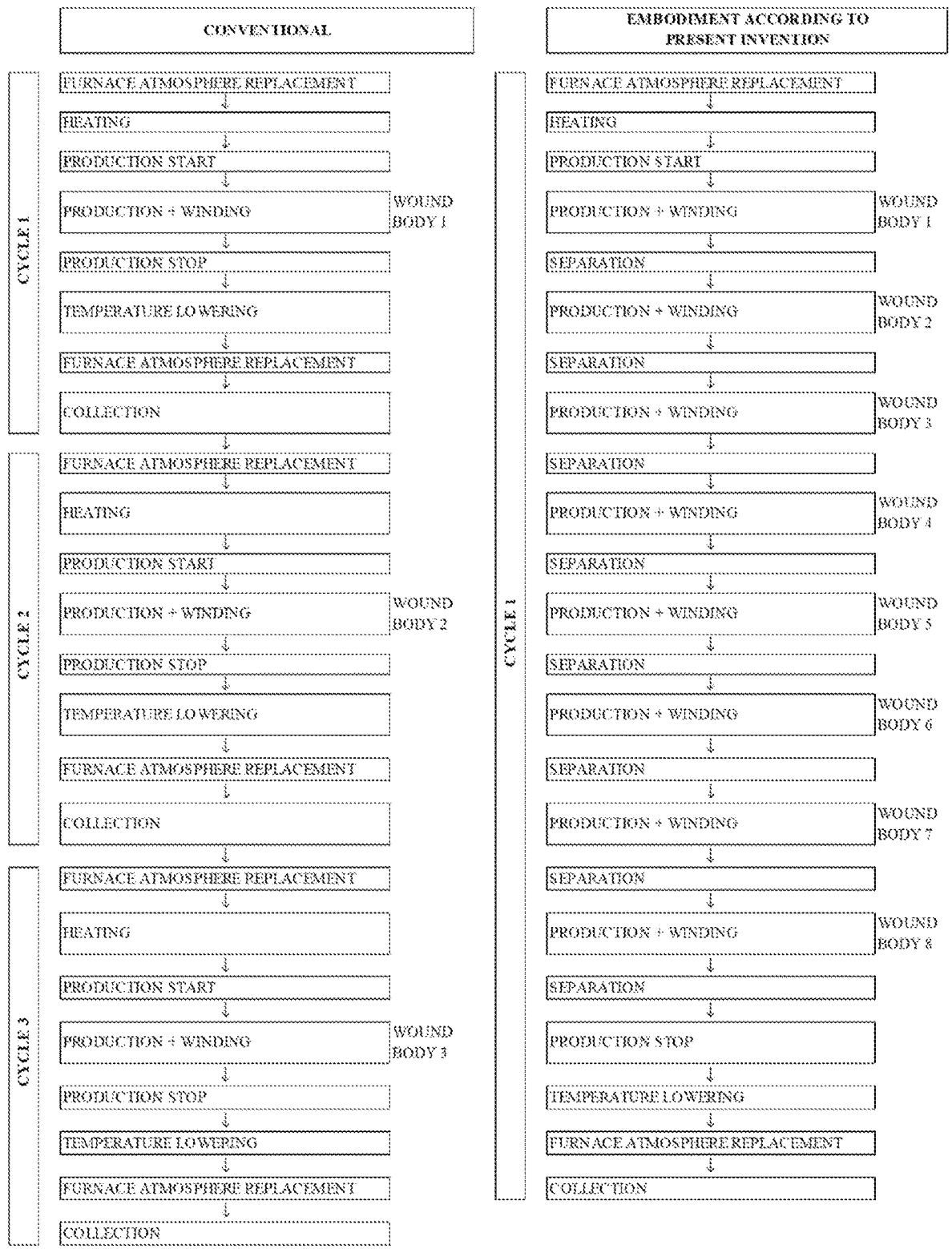
FIG. 10 is a chart illustrating an example of a cycle flow in massively manufacturing the carbon nanotube.

Using the above CNT collection apparatus 3 in massively manufacturing the CNTs makes it possible to manufacture the CNT wound body R, for example, along a cycle flow illustrated in FIG. 10. Note that FIG. 10 also illustrates a cycle flow of a collection apparatus having a conventional structure requiring collection of the CNT wound body R every time one CNT wound body R is formed. As illustrated in FIG. 10, in the case of the conventional collection apparatus, every time one CNT wound body R is formed, the CNT wound body R needs to be collected, so that only one CNT wound body R can be manufactured in one cycle. On the other hand, the collection apparatus 3 in this embodiment can repeatedly perform the formation and separation of a plurality of CNT wound bodies R in one cycle because the separation mechanism 50 is provided. Therefore, the amount of production of the CNT wound bodies R per cycle can be increased as compared with the conventional collection apparatus. This can shorten the manufacturing time to manufacture a desired amount of carbon nanotubes in the case of massively manufacturing the CNTs.

Second Embodiment

In the above first embodiment, the push-out member 51 pushes out the CNT wound body R to the tip end side of the winding members 42 to separate the CNT wound body R from the winding member 42. On the other hand, in a second embodiment, the winding member 42 is pulled out to the outside of the collection room 30 to move the CNT wound body R from the base end side toward the tip end side of the winding member 42 for separation. Hereinafter, the second embodiment will be explained with reference to FIG. 11 to FIG. 14.

Figure 11:
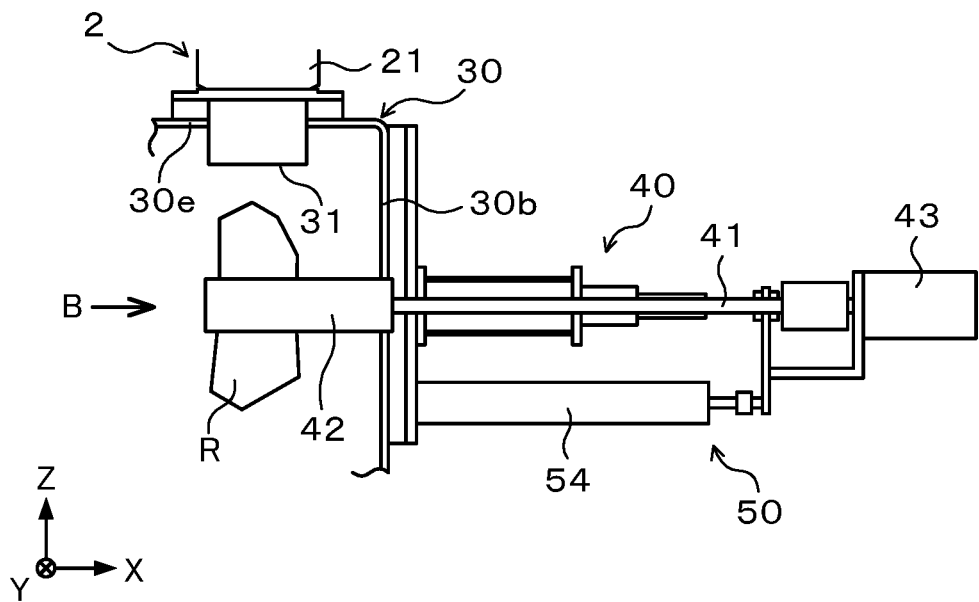
FIG. 11 is an explanatory view illustrating a schematic configuration of a separation mechanism according to a second embodiment.
Figure 12:
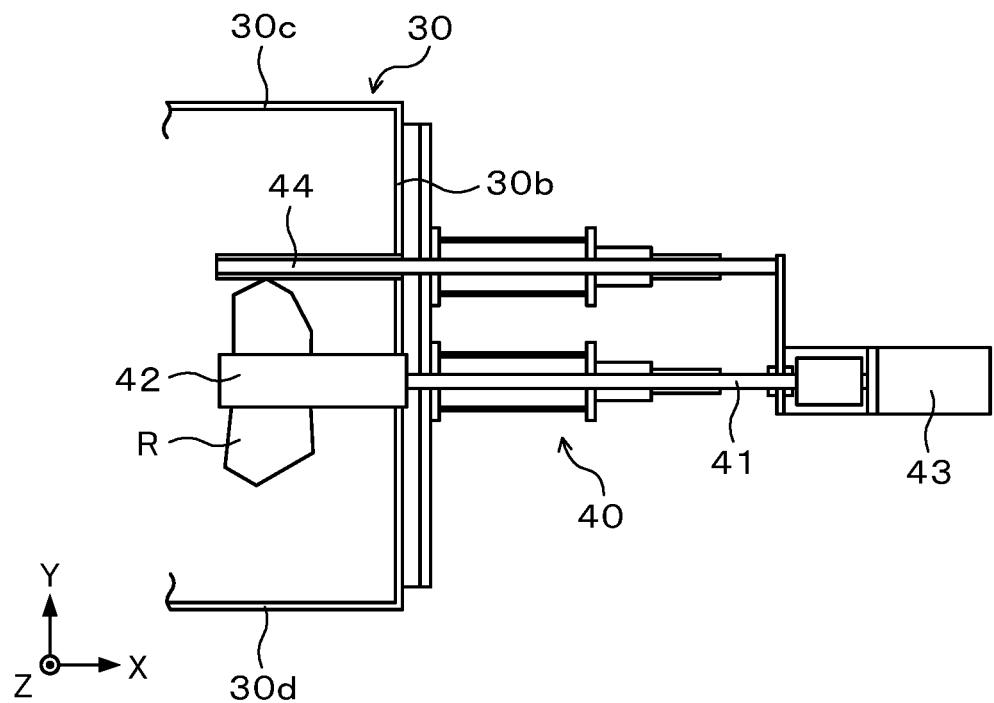
FIG. 12 is a view of the vicinity of a winding mechanism in FIG. 11 viewed from above.
Figure 13:
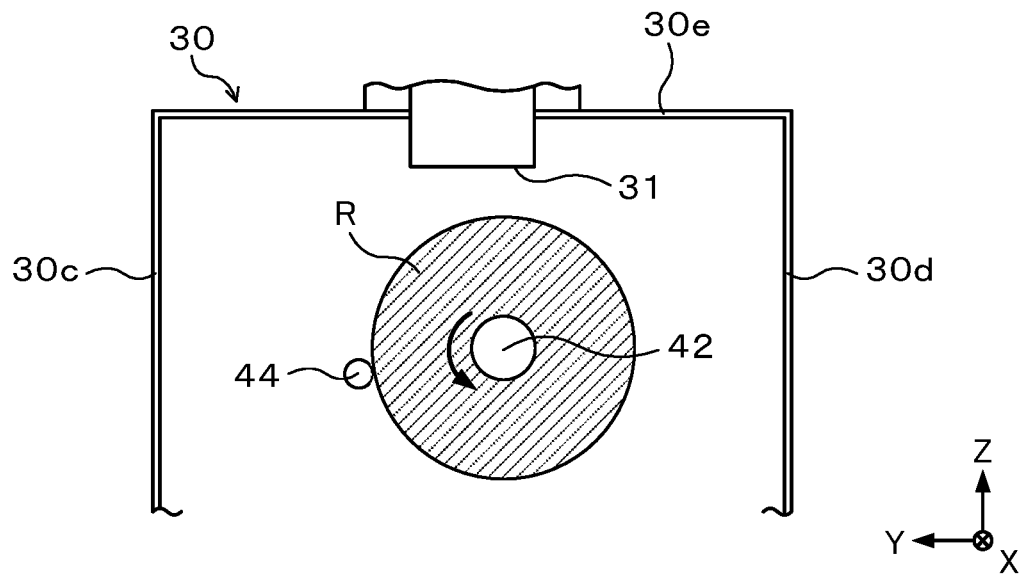
FIG. 13 is a view viewed from a direction of an arrow B in FIG. 11.
Figure 14:
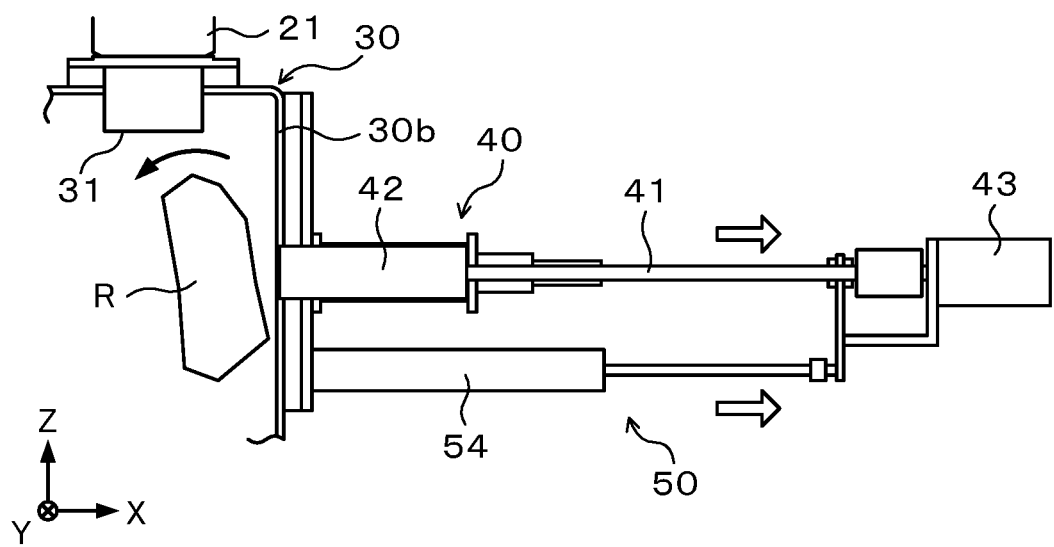
FIG. 14 is a view illustrating a state where a winding member has moved to a pull-out position.

FIG. 11 is an explanatory view illustrating a schematic configuration of a separation mechanism 50 according to the second embodiment. FIG. 12 is a view of the vicinity of a winding mechanism 40 in FIG. 11 viewed from above. FIG. 13 is a view viewed from a direction of an arrow B in FIG. 11. FIG. 14 is a view illustrating a state where the winding member 42 has moved to a pull-out position.

As illustrated in FIG. 11, a ceiling surface part 30e of a collection room 30 is provided with an opening part 31 communicating with a lower end of a reaction tube 21 of a production apparatus 2 as in the first embodiment, and CNTs produced in the reaction tube 21 are transported into the collection room 30 through the opening part 31. Also in this embodiment, the shape of the winding member 42 is not particularly limited, and the winding member 42 is composed of one member in a circular columnar shape or a circular cylindrical shape (namely roller) in an example illustrated in FIG. 11. The winding member 42 is connected to one end of a rotary body 41, and a driving part 43 is connected to the other end of the rotary body 41. Further, a rotation axis of the rotary body 41 is oriented in the horizontal direction as the direction perpendicular to the axis L (FIG. 1) extending in the vertical direction.

A separation mechanism 50 in this embodiment is a mechanism which moves the above rotary body 41, winding member 42, and driving part 43 in a direction from the inside toward the outside of the collection room 30. In other words, the separation mechanism 50 is a mechanism which can move the winding member 42 in a direction of pulling it out of the collection room 30, and the winding member 42 can be moved from the tip end side toward the base end side of the winding member 42 by the separation mechanism 50. As one example of the mechanism, a cylinder mechanism 54 is provided outside the collection room 30 in this embodiment. The winding member 42 can move between a position where the CNTs are wound (winding position) illustrated in FIG. 11 and a position where a CNT wound body R is separated from the winding member 42 (pull-out position) illustrated in FIG. 14 by an expanding and contracting operation of the cylinder mechanism 54. In short, the winding member 42 can move in a manner to come close to or separate from the side surface part 30b of the collection room 30.

According to the collection apparatus 3 having the above configuration, the winding member 42 located at the winding position forms the CNT wound body R, and then the winding member 42 is retracted to the pull-out position illustrated in FIG. 14 to bring the CNT wound body R into contact with the inner surface of the side surface part 30b of the collection room 30. Then, the winding member 42 is further retracted in a state where the CNT wound body R is in contact with the inner surface of the side surface part 30b to bring the inner peripheral surface of the CNT wound body R into a state where its inner peripheral surface is not supported any longer by the winding member 42, resulting in that the CNT wound body R falls off the winding member 42. This separates the CNT wound body R from the winding member 42. Thereafter, the winding member 42 moves forward from the pull-out position to the winding position and starts to wind the CNTs for forming a next CNT wound body R.

Also in the collection apparatus 3 in the second embodiment, the CNT wound body R can also be separated from the winding member 42 by the separation mechanism 50. Therefore, it is possible to increase the amount of production of the CNT wound bodies R producible per cycle as compared with the conventional one and to shorten the manufacturing time to manufacture a desired amount of carbon nanotubes in massively manufacturing the CNTs as in the first embodiment.

Further, according to the collection apparatus 3 which moves the winding member 42 in a direction of pulling it out of the collection room 30 to separate the CNT wound body R as in the second embodiment, it is possible to shorten the manufacturing time to manufacture a desired amount of carbon nanotubes than in the case of separating the CNT wound body R by using the push-out member 51 as in the first embodiment.

Note that the separation member in the first embodiment is the push-out member 51, but the separation member arranged on the base end side of the winding member 42 in the second embodiment is the side surface part 30b of the collection room 30 because the side surface part 30b of the collection room 30 comes into contact with the CNT wound body R in the second embodiment. Further, the inner surface of the side surface part 30b of the collection room 30 may be provided with, for example, a plate-shaped member (not illustrated) having a Teflon coating thereon. In the case where the plate-shaped member is provided, the CNTs are less likely to adhere to the inner surface of the side surface part 30b when the winding member 42 is retracted from the winding position to the pull-out position to separate the CNT wound body R. The separation member arranged on the base end side of the winding member 42 in this case is the plate-shaped member having a Teflon coating thereon.

The explanation of the separation step of the CNT wound body R in this embodiment is as above, but it is preferable to provide a compression member 44 in the collection apparatus 3 as illustrated in FIG. 12 and FIG. 13 in terms of efficiently collecting the CNT. The compression member 44 is a member for increasing the density of the CNT wound body R by compressing the CNT wound body R, and is formed of, for example, stainless steel. The compression member 44 has a shape (for example a circular columnar shape) extending in the rotation axis direction (X-direction) of the winding member 42, and is arranged on the lateral side of the winding member 42 as viewed from the rotation axis direction (X-direction) of the winding member 42 as illustrated in FIG. 13.

In the case where the compression member 44 is provided, when the outer diameter of the CNT wound body R increases because winding of the CNTs progresses in the formation step of the CNT wound body R, the outer peripheral surface of the CNT wound body R comes into contact with the outer peripheral surface of the compression member 44. Then, when the winding of the CNTs further progresses in this state, the outer peripheral surface of the CNT wound body R continues to be in contact with the compression member 44 at all times, resulting in that the outer diameter of the CNT wound body R is maintained without further increase. On the other hand, the supply of the CNTs to the winding member 42 continues even in such a state of the CNT wound body R, and the winding of the CNTs is continued. Therefore, at a contact portion between the CNT wound body R and the compression member 44, a force of pushing the CNTs from the outer peripheral surface toward a central portion of the CNT wound body R is generated to compress the CNT wound body R. The compression of the CNT wound body R as above increases the density of the CNT wound body R to increase the collection amount of the CNTs per collection of the CNT wound bodies R. Further, the compression of the CNT wound body R can make the volume of the collection room 30 compact to improve the space productivity by space saving.

Further, the compression member 44 is preferably configured to rotate when coming into contact with the CNT wound body R, for example, by being supported by a bearing. With such a configuration, the compression member 44 rotates when the CNT wound body R comes into contact with the compression member 44, so that the rotation resistance of the CNT wound body R is reduced and the CNT wound body R is easily formed into a roll shape.

Further, the compression member 44 is preferably constituted to be movable in the direction in which it is pulled out of the collection room 30 as with the winding member 42. This makes it possible for the CNTs adhering to the compression member 44 to fall off the compression member 44 to increase the collection amount of the CNTs.

Third Embodiment

The configuration example in which the compression member 44 comes into contact with the CNT wound body R and thereby is driven to rotate is explained in the above second embodiment, and a configuration example in which the compression member 44 rotates on its own axis irrespective of the presence or absence of the contact with the CNT wound body R will be explained in a third embodiment. Hereinafter, the third embodiment will be explained with reference to FIG. 15 to FIG. 17.

Figure 15:
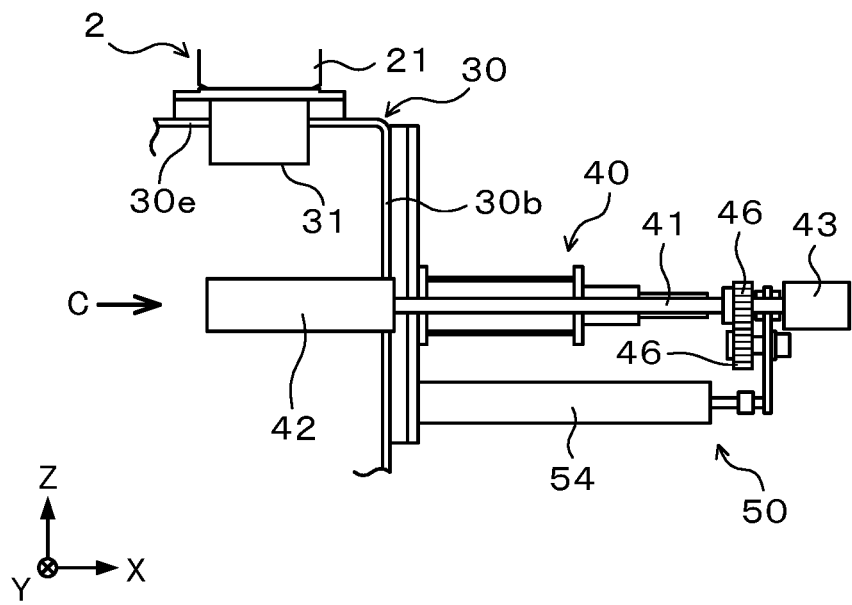
FIG. 15 is an explanatory view illustrating a schematic configuration of a separation mechanism according to a third embodiment.
Figure 16:
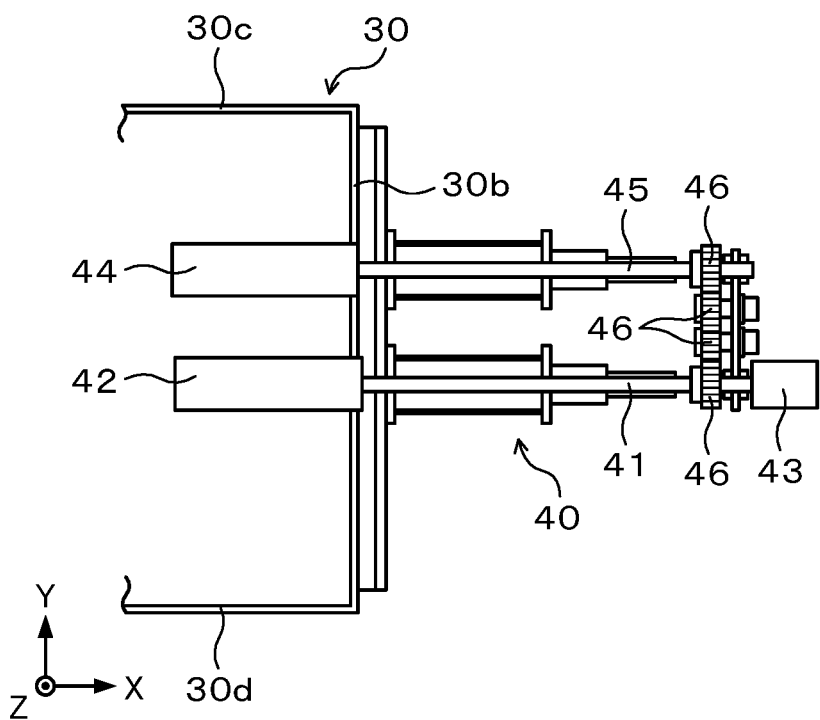
FIG. 16 is a view of the vicinity of a winding mechanism in FIG. 15 viewed from above.
Figure 17:
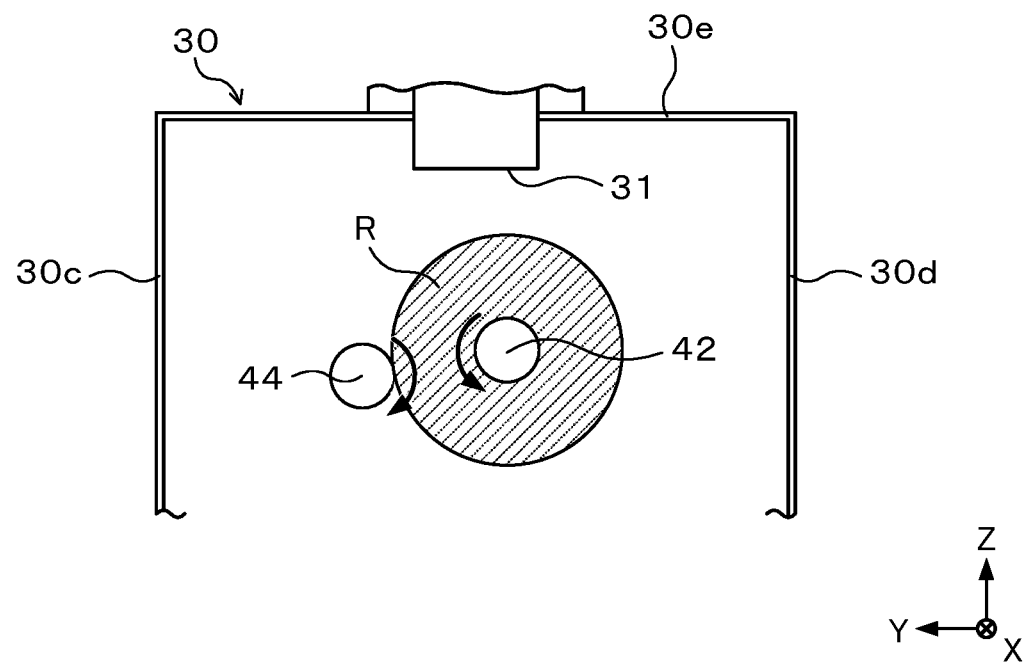
FIG. 17 is a view viewed from a direction of an arrow C in FIG. 15.

FIG. 15 is an explanatory view illustrating a schematic configuration of a separation mechanism 50 according to the third embodiment. FIG. 16 is a view of the vicinity of a winding mechanism 40 in FIG. 15 viewed from above. FIG. 17 is a view viewed from a direction of an arrow C in FIG. 15.

As illustrated in FIG. 15, a ceiling surface part 30e of a collection room 30 is provided with an opening part 31 communicating with a lower end of a reaction tube 21 of a production apparatus 2 as in the second embodiment, and CNTs produced in the reaction tube 21 are transported into the collection room 30 through the opening part 31. Also in the third embodiment, a winding member 42 is pulled out to the outside of the collection room 30 and a CNT wound body R is moved from the base end side toward the tip end side of the winding member 42, whereby the CNT wound body R is separated as in the second embodiment. Therefore, as with the collection apparatus 3 in the second embodiment, it is possible to shorten the manufacturing time to manufacture a desired amount of carbon nanotubes than the collection apparatus 3 using the push-out member 51 as in the first embodiment in the massively manufacturing the CNTs.

As illustrated in FIG. 16, a rotary body 45 is connected to a compression member 44 in this embodiment as with the winding member 42. The rotation axes of the rotary body 45 and the rotary body 41 are oriented in the horizontal direction as the direction perpendicular to the axis L (FIG. 1) extending in the vertical direction. Further, the rotary body 45 and the rotary body 41 are coupled to each other via a plurality of gears 46 and configured such that the rotary body 45 and the rotary body 41 rotate in directions opposite to each other when the rotary body 41 is rotated by a driving part 43. In other words, the compression member 44 and the winding member 42 are configured to rotate in directions opposite to each other.

Specifically, it is preferable that the compression member 44 rotates clockwise and the winding member 42 rotates counterclockwise as illustrated in FIG. 17 viewing the rotation axis direction (X-direction) of the rotary body 41 from the inner side of the collection room 30. This makes it possible to wind CNTs flowing downward from the opening part 31 without going against the flow of the CNTs. Thus, it is possible to suppress the retention of the CNTs which may occur between the opening part 31 and the winding member 42, and to continue the winding of the CNTs for a longer time. Note that, for example, stainless steel is employed as the material of the rotary body 44 and, for example, carbon steel is employed as the material of the gears 46.

According to the collection apparatus 3 having the configuration that the compression member 44 rotates on its own axis as above, the rotation resistance of the CNT wound body R is further reduced as compared with the case where the compression member 44 is driven to rotate as in the second embodiment, thus making it easier to form the CNT wound body R into a roll shape.

Note that the driving force of the driving part 43 is transmitted to the rotary body 45 connected with the compression member 44 by using the plurality of gears 46 in this embodiment, but another driving part (not illustrated) dedicated to the rotary body 45 may be provided.

The above-explained configurations of the collection apparatuses 3 according to the first to third embodiments can be combined in a range without inhibiting the function of separating the CNT wound body R from the winding member 42. For example, the collection apparatuses 3 each moving either the winding member 42 or the separation member so that the tip of the winding member 42 and the separation member relatively come closer are explained in the first to third embodiments, but both of the winding member 42 and the separation member may be moved so as to make the tip of the winding member 42 and the separation member relatively come closer. For example, the push-out member 51 being one example of the separation member is moved from the base end side toward the tip end side of the winding member 42 when separating the CNT wound body R in the first embodiment, but the winding member 42 may be moved in a direction of pulling it out of the collection room 30 in that event as in the second to third embodiments. The configuration of moving both the winding member 42 and the separation member can perform the separation of the CNT wound body R in a shorter time.

Besides, for example, in the first embodiment, the compression member 44 in the second and third embodiments may be applied in place of the guide member 70. Besides, for example, in the second and third embodiments, the guide member 70 in the first embodiment may be applied in place of the compression member 44.

Next, arrangement examples of winding members 42 in the case of providing a plurality of winding members 42 each composed of a roller in a circular columnar shape or a circular cylindrical shape will be explained. Note that the separation mechanism 50 according to each of the above first to third embodiments is also applicable to the winding member 42. In the following examples, the separation mechanism 50 of a type of pulling out the winding member 42 explained in the second embodiment is applied, but the illustration of the separation mechanism 50 is omitted in the drawings which are referred to in the following explanation.

Arrangement Example 1

Figure 18:
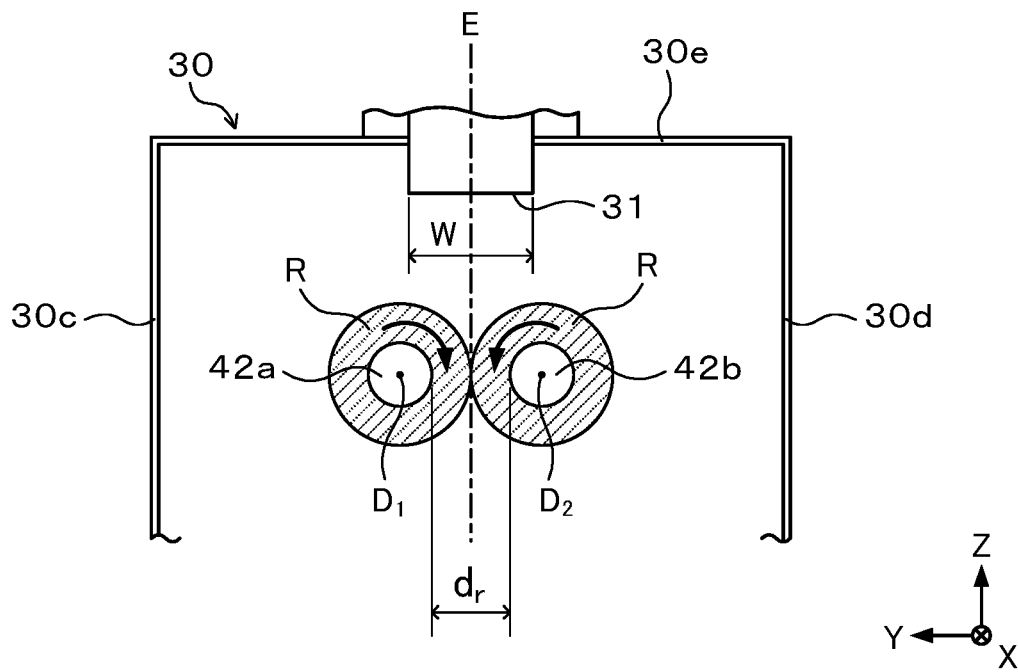
FIG. 18 is a view for explaining Arrangement Example 1 of winding members in a case where a plurality of winding members each composed of a roller are provided.
Figure 19:
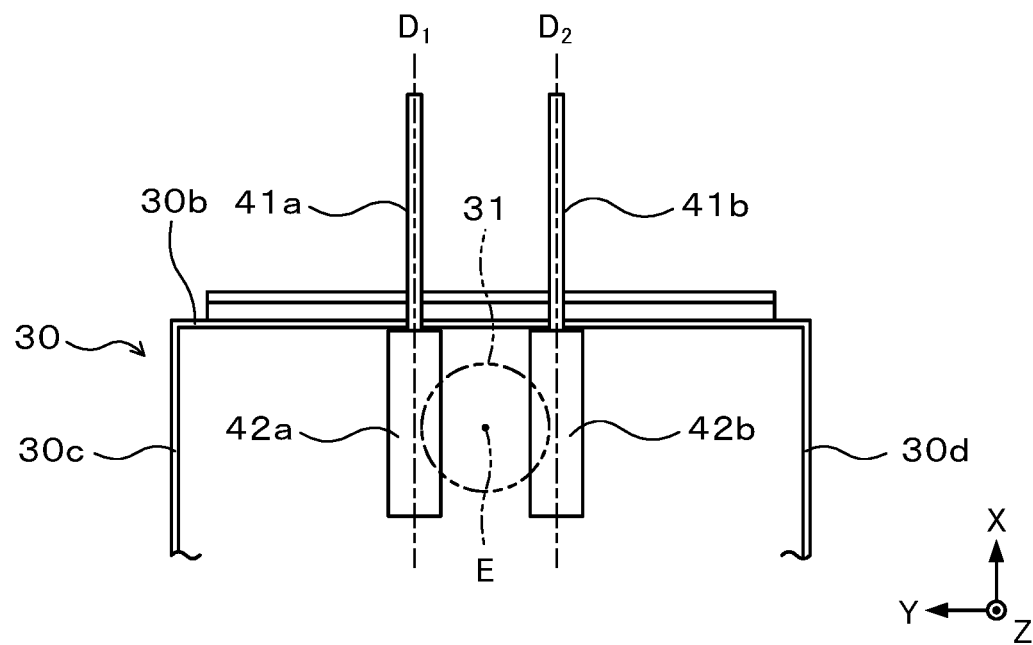
FIG. 19 is a view schematically illustrating the arrangement of the winding members and rotary bodies when viewing a collection room in FIG. 18 from above.

First, Arrangement Example 1 will be explained. FIG. 18 is a view for explaining Arrangement Example 1 of winding members 42a, 42b. FIG. 19 is a view schematically illustrating the arrangement of the winding members 42a, 42b and rotary bodies 41a, 41b when viewing the collection room 30 in FIG. 18 from above, and the illustration of the CNT wound bodies R is omitted in this drawing.

As illustrated in FIG. 18 and FIG. 19, two winding members 42a, 42b are provided below the opening part 31 of the collection room 30 in this arrangement example. Further, two rotary bodies 41a, 41b corresponding to the winding members 42a, 42b are provided, the base end of a first winding member 42a is attached to a first rotary body 41a, and the base end of a second winding member 42b is attached to a second rotary body 41b.

Each of a rotation axis $D_1$ of the first rotary body 41a and a rotation axis $D_2$ of the second rotary body 41b is oriented in a direction perpendicular to a center line E of the opening part 31 and in a horizontal direction (X-direction in the example of FIG. 18). The "center line E of the opening part" is a straight line (vertical line in the example of FIG. 18) passing through the center of the opening part 31 and extending in a direction perpendicular to an opening surface. The center of the opening part 31 is a center of gravity of the shape of the opening part 31. Specifically, for example, in the case where the shape of the opening part 31 is a circle as illustrated with a two-dotted chain line in FIG. 19, the center of the circle is the center of the opening part 31, and in the case where the shape of the opening part 31 is a quadrangle, the intersection of diagonals is the center of the opening part 31.

Note that the center line E of the opening part 31 and the axis L illustrated in FIG. 1 are located on the same straight line in the CNT manufacturing apparatus 1 exemplified in this description.

The first winding member 42a rotates around the rotation axis $D_1$ of the first rotary body 41a, and the second winding member 42b rotates around the rotation axis $D_2$ of the second rotary body 41b. The first rotary body 41a and the second rotary body 41b are arranged at an interval from each other, and the interval is a length at which a CNT wound body R wound on the first winding member 42a and another CNT wound body R wound on the second winding member 42b can come into contact with each other as illustrated in FIG. 18.

The arrangement of the rotary bodies 41a, 41b and the winding members 42a, 42b at the interval brings about a state where one of the two CNT wound bodies R and the other CNT wound body R compress each other. This limits the size of the outer diameter of each of the two CNT wound bodies R, thus making it possible to continue the winding of the CNTs for a longer time. As a result of this, the collection amount of the CNTs per collection of the CNT wound bodies R can be increased.

Note that the first winding member 42a and the second winding member 42b are arranged side by side on the right and left in the example illustrated in FIG. 18, but may be arranged one on top of the other or may be diagonally arranged such as at the upper left and lower right or at the lower left and upper right. Even this arrangement can bring about a state where the two CNT wound bodies R compress each other if the winding members 42a, 42b are arranged such that the CNT wound bodies R wound on the winding members 42a, 42b come into contact with each other.

Besides, when the lateral direction (Y-direction in the example in FIG. 18) when viewed from the rotation axis $D_1$ direction of the rotary body 41a is defined as a width direction of the collection room 30, a position of the rotation axis $D_1$ of the first rotary body 41a in the width direction and a position of the rotation axis $D_2$ of the second rotary body 41b in the width direction are preferably different from each other. In other words, it is preferable that the position of the rotation axis $D_1$ of the first rotary body 41a and the position of the rotation axis $D_2$ of the second rotary body 41b are not coincident in the width direction. This makes the CNTs passed through the opening part 31 easy to come into contact with one of the two winding members 42a, 42b, thereby reducing the amount of CNTs not to be wound.

Note that the above width direction of the collection room 30 can also be rephrased as a direction perpendicular to the center line E of the opening part 31 when viewed from the rotation axis $D_1$ direction of the first rotary body 41a.

As illustrated in FIG. 18, it is preferable that the center line E of the opening part 31 is located between the rotation axis $D_1$ of the first rotary body 41a and the rotation axis $D_2$ of the second rotary body 41b. The arrangement of the rotation axis $D_1$ of the first rotary body 41a and the rotation axis $D_2$ of the second rotary body 41b with the center line E of the opening part 31 intervening therebetween can enhance the possibility of the CNTs coming into contact with one of the two winding members 42a, 42b, and further reduce the amount of CNTs to be not wound.

Note that only two winding members 42 are provided in the above Arrangement Example 1 of the winding members 42a, 42b, but three or more winding members 42 may be provided. Even in this case, the effect of the CNT wound bodies R compressing each other as explained above can be obtained by setting the interval between the winding members (in other words, an interval between the rotary bodies) to an appropriate interval. In terms of enhancing the effect, an interval dr between adjacent winding members preferably has a length of 0.1 to 0.9 times a length (width W) of the opening part 31 in the width direction (Y-direction in the example in FIG. 18).

Arrangement Example 2

Next, Arrangement Example 2 of winding members 42 will be explained. The explanation may be omitted for the same content as that in Arrangement Example 1 in the following explanation.

Figure 20:
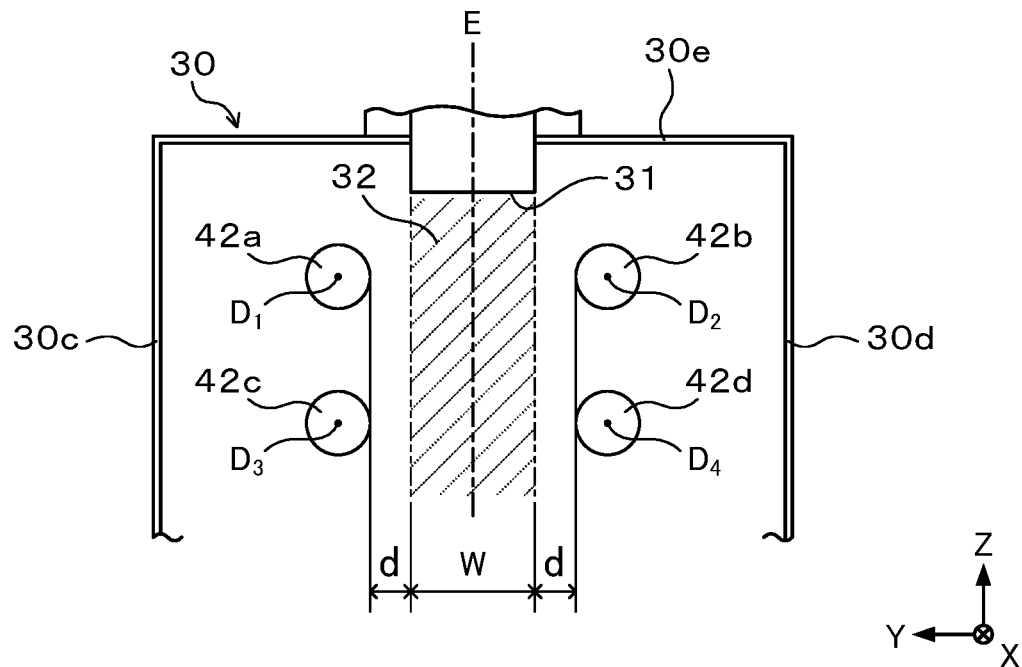
FIG. 20 is a view for explaining Arrangement Example 2 of winding members in which a plurality of winding members each composed of a roller are provided.
Figure 21:
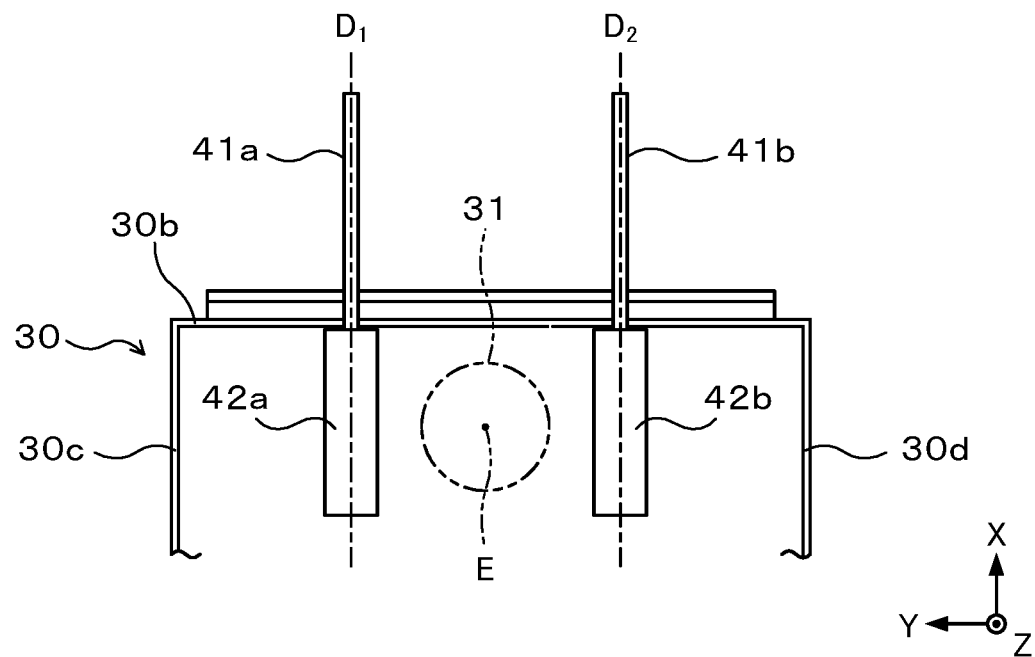
FIG. 21 is a view schematically illustrating the arrangement of the winding members and rotary bodies when viewing a collection room in FIG. 20 from above.
Figure 22:
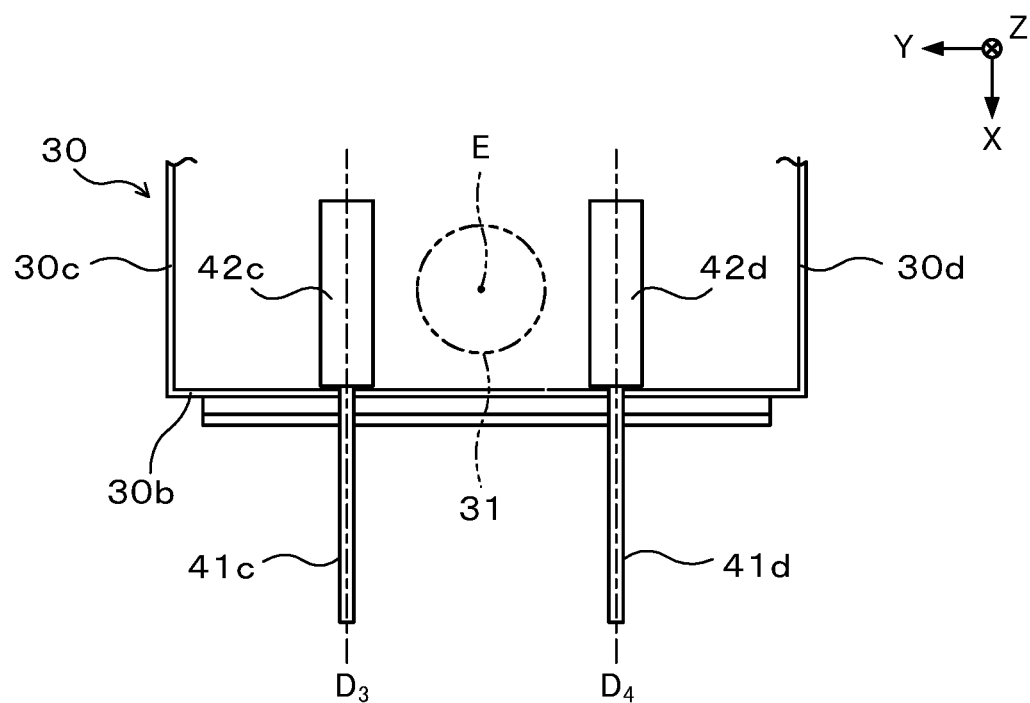
FIG. 22 is a view schematically illustrating the arrangement of the winding members and rotary bodies when viewing the collection room in FIG. 20 from below.

FIG. 20 is a view for explaining Arrangement Example 2 of winding members 42a to 42d. FIG. 21 is a view schematically illustrating the arrangement of the winding members 42a, 42b and rotary bodies 41a, 41b when viewing a collection room 30 in FIG. 20 from above. FIG. 22 is a view schematically illustrating the arrangement of the winding members 42c, 42d and rotary bodies 41c, 41d when viewing the collection room in FIG. 20 from below.

As illustrated in FIG. 20 to FIG. 22, four rotary bodies 41a to 41d and four winding members 42a to 42d are provided in this arrangement example. The base end of the first winding member 42a is attached to the first rotary body 41a, and the base end of the second winding member 42b is attached to the second rotary body 41b. Further, the base end of the third winding member 42c is attached to the third rotary body 41c, and the base end of the fourth winding member 42d is attached to the fourth rotary body 41d.

All of a rotation axis $D_1$ of the first rotary body 41a, a rotation axis $D_2$ of the second rotary body 41b, a rotation axis $D_3$ of the third rotary body 41c, and a rotation axis $D_4$ of the fourth rotary body 41d are oriented in the horizontal direction. Further, the rotation axis $D_1$ of the first rotary body 41a and the rotation axis $D_2$ of the second rotary body 41b are arranged with the center line E of the opening part 31 intervening therebetween, and the rotation axis $D_3$ of the third rotary body 41c and the rotation axis $D_4$ of the fourth rotary body 41d are also arranged with the center line E of the opening part 31 intervening therebetween.

In addition, the third rotary body 41c and the third winding member 42c are located below the first rotary body 41a and the first winding member 42a, and positions of the rotation axis $D_3$ of the third rotary body 41c and the rotation axis $D_1$ of the first rotary body 41a in the width direction (Y-direction) are coincident with each other. Similarly, the fourth rotary body 41d and the fourth winding member 42d are located below the second rotary body 41b and the second winding member 42b, and positions of the rotation axis $D_4$ of the fourth rotary body 41d and the rotation axis $D_2$ of the second rotary body 41b in the width direction (Y-direction) are coincident with each other.

In other words, the first winding member 42a is located between a wall surface 30e, of the collection room 30, provided with the opening part 31 and the third winding member 42c, and the second winding member 42b is located between the wall surface 30e and the fourth winding member 42d.

The rotation directions of the first winding member 42a and the third winding member 42c are preferably opposite directions and, specifically, it is preferable that the first winding member 42a rotates clockwise and the third winding member 42c rotates counterclockwise when viewing the rotation axis $D_1$ direction (X-direction) of the first rotary body 41a from the inner side of the collection room 30. This makes it possible to wind the CNTs passed through the opening part 31 without going against the flow of the CNTs. For the same reason, it is preferable that the second winding member 42b rotates counterclockwise and the fourth winding member 42d rotates clockwise when viewing the rotation axis $D_1$ direction (X-direction) of the second rotary body 41b from the inner side of the collection room 30.

Furthermore, as illustrated in FIG. 20, none of the winding members 42a to 42d are arranged in an exit side region 32 (shaded region in FIG. 20) of the opening part 31. The exit side region 32 is defined as a region extending from the opening part 31 toward the inner side of the collection room 30 along the center line E of the opening part 31. When it is assumed that a length in a direction (Y-direction in an example of FIG. 20) perpendicular to the center line E of the opening part 31 when viewed from the rotation axis $D_1$ of the first rotary body 41a in the exit side region 32 is a width of the exit side region 32, this width has the same length as the length (width W) of the opening part 31 in that direction. In other words, a cross-sectional area of the exit side region 32 cut perpendicular to the center line E and an opening are of the opening part 31 are equal to each other.

Figure 23:
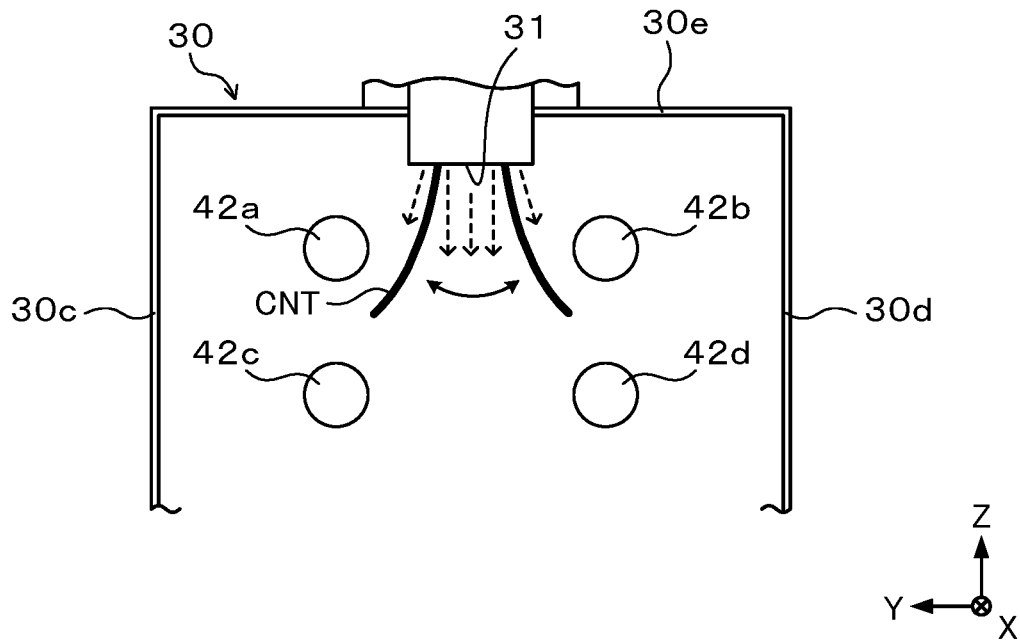
FIG. 23 is a view for explaining a flow of a carrier gas and a state of carbon nanotubes passed through an opening part. is illustrated with dotted arrows.

Here, the flow of a carrier gas passed through the opening part 31 and the state of the CNTs will be explained. FIG. 23 is a view for explaining them, and the carrier gas is illustrated with dotted arrows. First of all, the carrier gas flowing from the opening part 31 into the collection room 30 mainly flows toward below the opening part 31.

In the case where the plurality of winding members 42a, 42b are arranged side by side in the width direction below the opening part 31 as in Arrangement Example 1 illustrated in FIG. 18, the flow path of the carrier gas is narrowed below the opening part 31 due to the formation of the CNT wound bodies R on the winding members 42a, 42b. Therefore, as the winding of the CNTs by the winding members 42a, 42b progresses, the carrier gas becomes difficult to flow downward and becomes likely to flow in a direction parallel to an X-Y plane, between the opening part 31 and the winding members 42a, 42b.

In this event, the CNTs passed through the opening part 31 also flow within the X-Y plane and the CNTs may become difficult to come into contact with the winding members 42a, 42b under the influence of the carrier gas flowing within the X-Y plane depending on the flow rate of the carrier gas, the area of the opening part 31, the production conditions of the CNTs, and the like. Therefore, in the case where the winding members 42a, 42b are arranged as in FIG. 18, the CNT wound bodies R are collected after the winding of the CNTs is performed for a certain time in order to avoid the occurrence of a state where the CNTs are not wound.

On the other hand, in the case where the winding members 42a to 42d are not arranged in a region below the opening part 31 as in Arrangement Example 2 illustrated in FIG. 23, the flow of the carrier gas flowing downward from the opening part 31 is not blocked, so that the direction in which the carrier gas flows is easy to stabilize.

Besides, the carrier gas exhausted from the opening part 31 flows from the opening part 31 having a limited flow path into the collection room 30 being a larger space as compared with the flow path, so that the carrier gas is released into the collection room 30 in a manner to radially diffuse from the opening part 31. Therefore, the carrier gas exhausted from the opening part 31 flows not only to below the opening part 31 but also in a diagonal direction. Thus, the CNTs produced in a string shape are influenced by the carrier gas flowing in the diagonal direction and easy to be discharged in the diagonal direction from the opening part 31.

For example, the CNTs passed through the opening part 31 move in a manner to be shaken right and left in the width direction (Y-direction) of the collection room 30, thus causing a state where the CNTs are discharged in a diagonally lower left direction and a diagonally lower right direction of the opening part 31 during the production of the CNTs.

Figure 24:
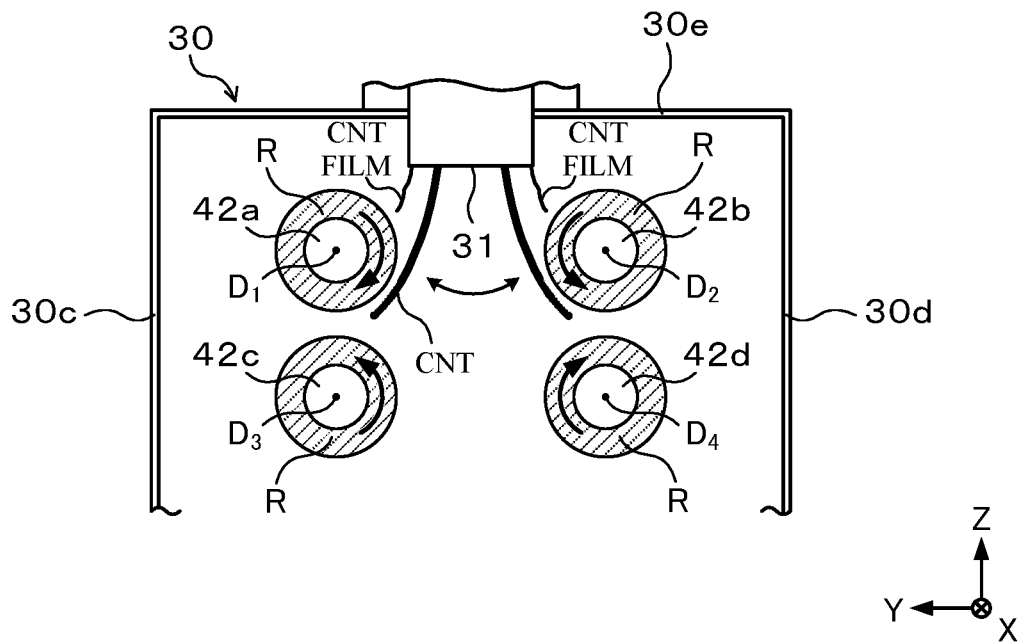
FIG. 24 is a view illustrating a state where the carbon nanotube is wound by the winding members illustrated in FIG. 20.

In Arrangement Example 2, the winding members 42a to 42d are not arranged in the exit side region 32 of the opening part 31, but the CNTs come into contact with one of the winding members 42a to 42d when the CNTs are discharged in the diagonal direction from the opening part 31 as explained above, so that the CNTs can be wound as illustrated in FIG. 24.

Note that in the case where the winding members 42a to 42d are arranged in the exit side region 32 of the opening part 31 as illustrated in FIG. 20, a distance d between the first winding member 42a and the edge of the opening part 31 in the width direction (Y-direction) is preferably a length of 0.15 to 0.65 times the width W of the opening part 31. This makes the CNTs passed through the opening part 31 easy to come into contact with the first winding member 42a. Further, a distance between the second winding member 42b and the edge of the opening part 31 is preferably made a similar distance.

As explained above, according to Arrangement Example 2 of the winding members 42a to 42d, it is possible to wind the CNTs by the winding members 42a to 42d without blocking the flow of the carrier gas in the exit side region 32 of the opening part 31. Thus, it is possible to reduce the collection frequency of the CNT wound bodies R and continue the winging of the CNTs for a longer time as compared with Arrangement Example 1. This can increase the collection amount of the CNTs per collection of the CNT wound bodies R.

Besides, fine CNTs sometimes adhere to the edge of the opening part 31 as illustrated in FIG. 24 and other fine CNTs further adhere to points where the former CNTs adhere and accumulate, and thereby may form films of the CNTs. When the CNT films grow and expand, the CNTs may sometimes scatter in a dust form by a jet of the carrier gas from gaps interspersed in the CNT films. The CNTs scattered in a dust form may not come into contact with the winding members 42a to 42d and the scattered CNTs may not be collected in some cases.

On the other hand, in the case where the winding members 42a to 42d are arranged outside the exit side region 32 of the opening part 31 (FIG. 20), when the CNT films at the edge of the opening part 31 expand, the CNT films can be wound by the first winding member 42a or the second winding member 42b. In short, in Arrangement Example 2 of the winding members 42a to 42d, there is an advantage that it becomes easy to strip the CNT films from the edge of the opening part 31.

Note that the third winding member 42c is preferably arranged at a position where the CNT wound body R wound on the first winding member 42a and the CNT wound body R wound on the third winding member 42c can come into contact with each other. This can bring about a state where the two CNT wound bodies R compress each other, thereby limiting the size of the outer diameter of the CNT wound body R formed on the first winding member 42a.

Therefore, by arranging the third winding member 42c at a position where the CNT wound body R on the first winding member 42a can be compressed in order to prevent the outer edge of the CNT wound body R from entering the exit side region 32 of the opening part 31, the state where the flow of the carrier gas is not blocked in the exit side region 32 of the opening part 31 can be maintained for a longer time. As a result of this, the winding of the CNTs can be continued for a much longer time.

For the same reason, it is preferable that the fourth winding member 42d is arranged at a position where the CNT wound body R wound on the second winding member 42b and the CNT wound body R wound on the fourth winding member 42d can come into contact with each other.

Incidentally, in terms of not blocking the flow of the carrier gas in the exit side region 32 of the opening part 31, it is not necessary to provide the third winding member 42c and the fourth winding member 42d. However, the provision of the winding members 42c, 42d can increase the opportunity of contact between the CNTs passed through the opening part 31 and the winding member to increase the collection amount of the CNTs.

Figure 25:
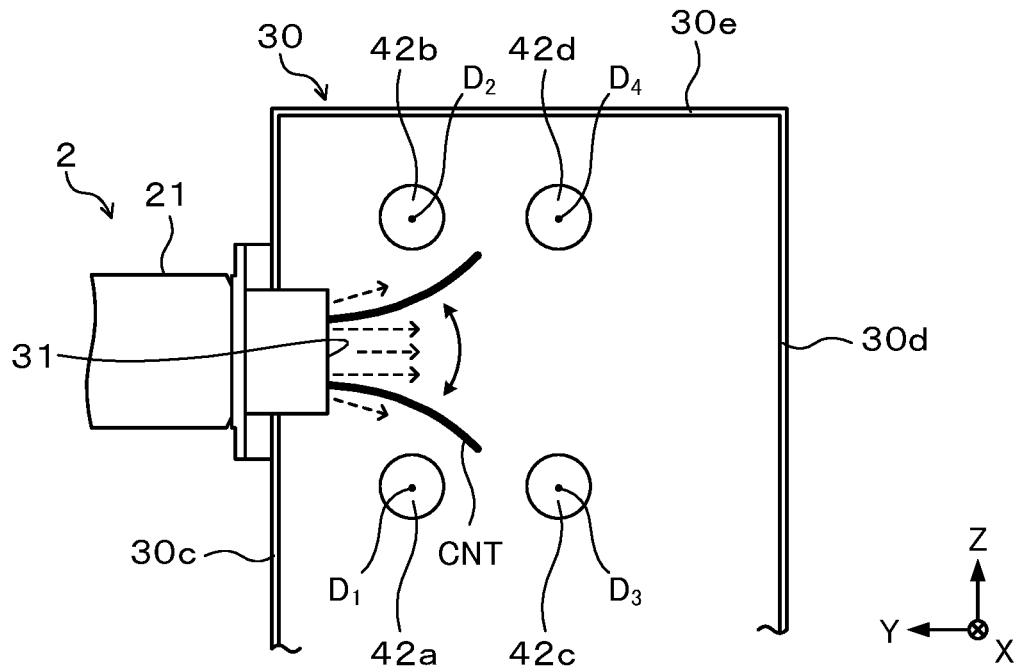
FIG. 25 is a view for explaining a flow of a carrier gas and a state of a carbon nanotube in a case where a reaction tube is installed at a side surface part of a collection room.
Figure 26:
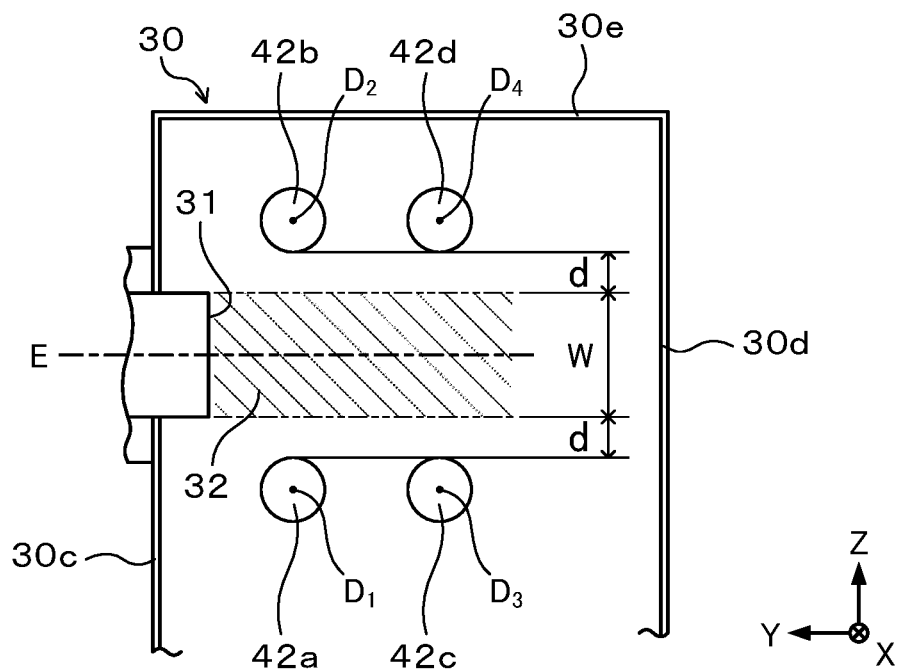
FIG. 26 is view illustrating an exit side region of the opening part in the case where the reaction tube is installed at the side surface part of the collection room.

Note that the reaction tube 21 of the CNT manufacturing apparatus 1 (FIG. 1) is sometimes arranged, for example, not at the ceiling surface part 30e but at the side surface part 30c of the collection room 30 as illustrated in FIG. 25 and FIG. 26. The exit side region 32 of the opening part 31 in this case is formed on the lateral side of the opening part 31. Besides, the rotation axes $D_1$ to $D_4$ are oriented in a direction perpendicular to the center line E and in the horizontal direction also in an example illustrated in FIG. 25 and FIG. 26.

Even in the case where the reaction tube 21 is horizontally connected to the collection room 30, the CNTs discharged from the opening part 31 are released into the collection room 30 in a manner to radially scatter from the opening part 31 because the CNTs are light in weight. Therefore, even in the case where a winding member is arranged above the exit side region 32, the CNTs can be wound by the winding member.

Accordingly, even in the case where the reaction tube 21 is connected to the collection room 30 not in the vertical direction but in the horizontal direction, advantageous effects similar to those in Arrangement Examples 1 to 3 can be obtained by applying the arrangements of the winding members in the above Arrangement Examples 1 to 2 or following Arrangement Example 3.

Arrangement Example 3

Next, Arrangement Example 3 of winding members 42 will be explained. Explanation of the same content as that in Arrangement Example 1 or Arrangement Example 2 may be omitted in the following explanation.

Figure 27:
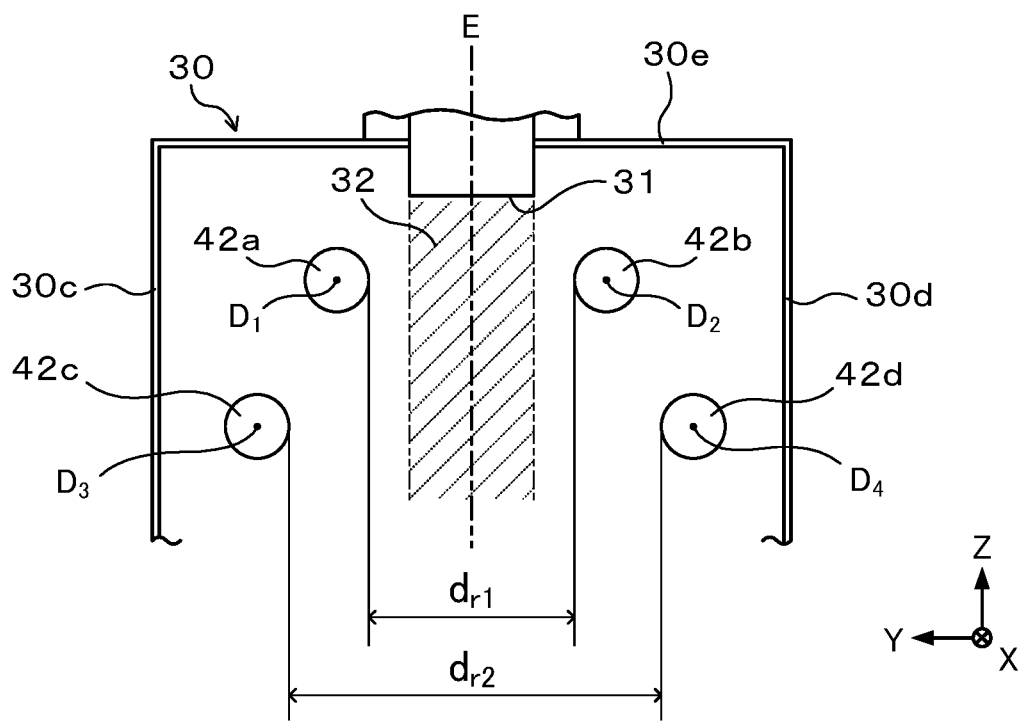
FIG. 27 is a view for explaining Arrangement Example 3 of winding members in a case where a plurality of winding members each composed of a roller are provided.

As illustrated in FIG. 27, in Arrangement Example 3, installation positions of the third winding member 42c and the fourth winding member 42d are different from those in Arrangement Example 2, and the interval between the third winding member 42c and the fourth winding member 42d is wider than the interval between the first winding member 42a and the second winding member 42b.

In other words, the rotation axis $D_1$ of the first rotary body 41a is located between the center line E of the opening part 31 and the rotation axis $D_3$ of the third rotary body 41c, and the rotation axis $D_2$ of the second rotary body 41b is located between the center line E of the opening part 31 and the rotation axis $D_4$ of the fourth rotary body 41d. The reason why it is preferable to arrange the winding members 42a to 42d as above is as follows.

The density of the CNTs to be discharged from the opening part 31 sometimes becomes low in some cases depending on the production condition of the CNTs, and in this case, the CNTs sometimes float due to the turbulence of atmosphere generated due to the rotation of the first winding member 42a and the second winding member 42b. Some of the floating CNTs do not come into contact with the first winding member 42a and the second winding member 42b but fall from the outside of the winding members 42a, 42b in the width direction to the bottom part of the collection room 30.

On the other hand, by arranging the third winding member 42c and the fourth winding member 42d on the outside of the first winding member 42a and the second winding member 42b in the width direction as in FIG. 27, the floating CNTs which cannot be fully collected by the winding members 42a, 42b can be collected by the winding members 42c, 42d. Note that in terms of enhancing the collection effect of the floating CNTs, an interval $d_{r1}$ between the first winding member 42a and the second winding member 42b and an interval $d_{r2}$ between the third winding member 42c and the fourth winding member 42d preferably satisfy $d_{r1}:d_{r2}=1:1.1$ to 3.0.

Arrangement Examples 1 to 3 in each of which a plurality of winding members 42 composed of rollers are provided are explained above.

Note that it is not necessary that all of the rotary bodies function as driving shafts in any of the arrangement examples. For example, in the case where the first rotary body 41a is a driving shaft and the third rotary body 41c is a driven shaft, the rotation of the third rotary body 41c is started by the CNT wound body R on the first winding member 42a coming into contact with the third winding member 42c.

However, before the start of the rotation of the third rotary body 41c, even if CNTs passed through the opening part 31 come into contact with the third winding member 42c, the CNTs are not wound by the third winding member 42c. Beside, the CNT wound body R is low in rigidity, so that even if the rotation of the third rotary body 41c is started by the contact between the CNT wound body R on the first winding member 42a and the third winding member 42c, the shape of the CNT wound body R on the first winding member 42a may collapse due to the rotation resistance.

Accordingly, in terms of reducing the amount of the CNTs which cannot be wound and suppressing the shape collapse of the CNT wound body R, it is preferable that all of the plurality of rotary bodies 41 are driving shafts. The rotation speed of the rotary body 41 being the driving shaft is set to, for example, 0.01 to 500 rpm. In addition, the rotation speeds of the adjacent rotary bodies 41 are preferably set within a rotation speed ratio of 0.9 to 1.1, and more preferably set at the same speed.

As explained above, the separation mechanisms 50 according to the first to third embodiments are applicable also in Arrangement Examples 1 to 3. In the case of applying the separation mechanism 50 according to the first embodiment, for example, the push-out member 51, the cover member 60, and the guide member 70 illustrated in FIG. 2 can be used. In this case, the push-out member 51, the cover member 60, and the guide member 70 may be provided one each, or a plurality of them may be provided for respective installation points of the rollers as the winding members 42.

For example, in FIG. 24, four winding members 42a to 42d are arranged, and CNT wound bodies R on the four winding members 42a to 42d may be separated all at once by the pushing-out operation by one push-out member (not illustrated). Alternatively, four small push-out members may be used and the push-out members may be attached to installation points of the four winding members 42a to 42d, respectively so that the CNT wound body R on one winding member is separated by the pushing-out operation of one push-out member.

Further, the winding member 42 is composed of a roller in the above Arrangement Examples 1 to 3, but such a configuration may be employed that a plurality of winding members 42 are attached to one rotary body 41 as illustrated, for example, in FIG. 3.

Embodiments of the present invention have been explained above, but the present invention is not limited to the embodiments. It should be understood that various changes and modifications are readily apparent to those skilled in the art within the scope of the technical spirit as set forth in claims, and those should also be covered by the technical scope of the present invention.

For example, configuration requirements of the above embodiments can be arbitrarily combined. The operations and effects about the configuration requirements relating to the combination can be obtained as a matter of course from the arbitrary combination, and those skilled in the art can obtain clear other operations and effects from the description herein.

The effects described herein are merely explanatory or illustrative in all respects and not restrictive. The technique relating to this disclosure can offer clear effects to those skilled in the art from the description herein in addition to or in place of the above effects.

INDUSTRIAL APPLICABILITY

The present invention is applicable to a collection apparatus and a manufacturing apparatus of a carbon nanotube.

EXPLANATION OF CODES

1 CNT manufacturing apparatus (carbon nanotube manufacturing apparatus)
2 CNT production apparatus (carbon nanotube production apparatus)
3 CNT collection apparatus (carbon nanotube collection apparatus)
21 reaction tube
22 heater
23 raw material supply port
30 collection room
30a side surface part
30b side surface part
30c side surface part
30d side surface part
30e ceiling surface part
30f bottom surface part
31 opening part
32 exit side region of opening part
40 winding mechanism
41 rotary body
41a first rotary body
41b second rotary body
41c third rotary body
41d fourth rotary body
42 winding member
42a first winding member
42b second winding member
42c third winding member
42d fourth winding member
43 driving part
44 compression member
45 rotary body
46 gear
50 separation mechanism
51 push-out member
51a opening part
52 driving rod
53 driving part
54 cylinder mechanism
60 cover member
70 guide member
71 plate-shaped member
72 plate-shaped member
73 flat plate
74 fixed point
$D_1$ rotation axis of first rotary body
$D_2$ rotation axis of second rotary body
$D_3$ rotation axis of third rotary body
$D_4$ rotation axis of fourth rotary body
E center line of opening part
L axis of reaction tube
R CNT wound body (carbon nanotube wound body)
W width of opening part

The invention claimed is:

1. A carbon nanotube collection apparatus for collecting a carbon nanotube produced by a carbon nanotube production apparatus, the carbon nanotube collection apparatus comprising:
a collection room having an opening part communicating with the carbon nanotube production apparatus;
a winding member arranged inside the collection room and configured to wind the carbon nanotube passed through the opening part from the carbon nanotube production apparatus to form a carbon nanotube wound body; and
a separation mechanism configured to move the carbon nanotube wound body from a base end side toward a tip end side of the winding member to separate the carbon nanotube wound body from the winding member.

2. The carbon nanotube collection apparatus according to claim 1, further comprising
a separation member arranged on the base end side of the winding member and configured to come into contact with the carbon nanotube wound body, wherein
the separation mechanism is a mechanism configured to move one or both of the winding member and the separation member so that a tip of the winding member and the separation member relatively come closer.

3. The carbon nanotube collection apparatus according to claim 2, wherein
the separation mechanism is a mechanism configured to move the winding member in a direction of pulling the winding member out of the collection room.

4. The carbon nanotube collection apparatus according to claim 2, wherein:
the separation member is a push-out member arranged in the collection room; and
the separation mechanism is a mechanism configured to move the push-out member from the base end side toward the tip end side of the winding member to push out and separate the carbon nanotube wound body from the tip of the winding member.

5. The carbon nanotube collection apparatus according to claim 4, wherein
the push-out member is formed in a manner to surround an outer periphery of the winding member.

6. The carbon nanotube collection apparatus according to claim 1, further comprising
a guide member configured to guide the carbon nanotube passed through the opening part to the winding member.

7. The carbon nanotube collection apparatus according to claim 1, further comprising:
a rotary body to which a base end of the winding member is attached; and
a compression member configured to come into contact with the carbon nanotube wound body wound on the winding member, wherein
the compression member extends in a rotation axis direction of the rotary body and is arranged at a lateral side of the winding member as viewed from the rotation axis direction of the rotary body.

8. The carbon nanotube collection apparatus according to claim 7, wherein
the compression member is configured to rotate in a direction opposite to a rotation direction of the rotary body.

9. The carbon nanotube collection apparatus according to claim 1, further comprising
a rotary body to which a base end of the winding member is attached, wherein
the winding member is supported in a cantilever state by the rotary body.

10. The carbon nanotube collection apparatus according to claim 1, further comprising:
a plurality of the winding members;
a first rotary body to which a base end of a first winding member is attached; and
a second rotary body to which a base end of a second winding member is attached, wherein
each of rotation axes of the first rotary body and the second rotary body is in a direction perpendicular to a center line of the opening part and in a horizontal direction.

11. The carbon nanotube collection apparatus according to claim 10, wherein
a position of the rotation axis of the first rotary body and a position of the rotation axis of the second rotary body in a direction perpendicular to the center line of the opening part when viewed from the rotation axis direction of the first rotary body are different from each other.

12. The carbon nanotube collection apparatus according to claim 11, wherein
the center line of the opening part is located between the rotation axis of the first rotary body and the rotation axis of the second rotary body.

13. The carbon nanotube collection apparatus according to claim 12, wherein
when a region extending from the opening part toward an inner side of the collection room along the center line of the opening part is defined as an exit side region of the opening part,
a width of the exit side region when viewed from the rotation axis direction of the first rotary body and a width of the opening part have a same length, and
none of the plurality of winding members are arranged in the exit side region.

14. The carbon nanotube collection apparatus according to claim 11, further comprising:
a third rotary body to which a base end of a third winding member is attached; and
a fourth rotary body to which a base end of a fourth winding member is attached, wherein:
each of rotation axes of the third rotary body and the fourth rotary body is in a direction perpendicular to the center line of the opening part and in the horizontal direction;
the first winding member is arranged between a wall surface, of the collection room, provided with the opening part and the third winding member; and
the second winding member is arranged between the wall surface and the fourth winding member.

15. The carbon nanotube collection apparatus according to claim 14, wherein:
the center line of the opening part is located between the rotation axis of the first rotary body and the rotation axis of the second rotary body;
the center line of the opening part is located between the rotation axis of the third rotary body and the rotation axis of the fourth rotary body; and
an interval between the third winding member and the fourth winding member is wider than an interval between the first winding member and the second winding member.

16. A carbon nanotube manufacturing apparatus, comprising:
a production apparatus for producing a carbon nanotube; and
the carbon nanotube collection apparatus according to claim 1.

17. A carbon nanotube collection method using the carbon nanotube collection apparatus according to claim 1, the carbon nanotube collection method comprising:
forming a carbon nanotube wound body by winding a carbon nanotube passed through the opening part of the carbon nanotube collection apparatus by the winding member; and
separating the carbon nanotube wound body from the winding member by moving the carbon nanotube wound body from the base end side toward the tip end side of the winding member, wherein
forming the carbon nanotube wound body and separating the carbon nanotube wound body are repeatedly performed to form a plurality of the carbon nanotube wound bodies and then collect the carbon nanotube wound bodies from the carbon nanotube collection apparatus.

18. The carbon nanotube collection method according to claim 17, wherein, during the separating of the carbon nanotube wound body, the carbon nanotube wound body is separated from the winding member by moving the winding member in a direction of pulling the winding member out of the collection room.

19. The carbon nanotube collection method according to claim 17, wherein, during the separating of the carbon nanotube wound body, the carbon nanotube wound body is separated from the winding member by pushing out the carbon nanotube wound body from the base end side toward the tip end side of the winding member.

* * * * *